(12) United States Patent
Imai

(10) Patent No.: US 10,447,567 B2
(45) Date of Patent: Oct. 15, 2019

(54) CONTROL APPARATUS AND PROCESSING METHOD FOR CONTROL APPARATUS

(71) Applicant: FUJITSU LIMITED, Kawasaki-shi, Kanagawa (JP)

(72) Inventor: Satoshi Imai, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 72 days.

(21) Appl. No.: 15/641,549

(22) Filed: Jul. 5, 2017

(65) Prior Publication Data

US 2018/0019937 A1  Jan. 18, 2018

(30) Foreign Application Priority Data

Jul. 14, 2016 (JP) .................. 2016-139338

(51) Int. Cl.
| | |
|---|---|
| *G06F 9/50* | (2006.01) |
| *H04L 5/00* | (2006.01) |
| *G06F 9/455* | (2018.01) |
| *H04L 12/24* | (2006.01) |
| *H04L 12/26* | (2006.01) |
| *H04L 29/06* | (2006.01) |

(52) U.S. Cl.
CPC ...... *H04L 43/0888* (2013.01); *G06F 9/45558* (2013.01); *G06F 9/5027* (2013.01); *H04L 5/0048* (2013.01); *H04L 41/20* (2013.01); *H04L 63/20* (2013.01); *G06F 2009/45595* (2013.01)

(58) Field of Classification Search
CPC .. H04L 47/825; H04L 47/781; H04L 12/6418
See application file for complete search history.

(56) References Cited

U.S. PATENT DOCUMENTS

| | | | |
|---|---|---|---|
| 2009/0122706 A1 | 5/2009 | Alfano et al. | |
| 2014/0010085 A1* | 1/2014 | Kavunder ......... | H04W 28/0215 370/235 |
| 2015/0271102 A1* | 9/2015 | Antich ................. | H04L 47/825 370/230 |

(Continued)

FOREIGN PATENT DOCUMENTS

| | | |
|---|---|---|
| JP | 2012-74056 | 4/2012 |
| JP | 2015-537278 | 12/2015 |

*Primary Examiner* — Melanie Jagannathan
(74) *Attorney, Agent, or Firm* — Staas & Halsey LLP

(57) ABSTRACT

A control apparatus includes a memory, and a processor coupled to the memory and the processor configured to receive a request to generate a communication path, calculate patterns in each of which a plurality of processing conditions for use in processing to be performed by communication devices arranged on the communication path are assigned to the communication devices usable to generate the communication path, determine a determined pattern for use in setting of a processing condition of the plurality of processing conditions from the calculated patterns, based on estimation information for associating a number of processing conditions with an estimated value of a throughput, the number of processing conditions and the estimated value of the throughput being set for the communication devices, and transmit a control packet to request each of the communication devices used in the determined pattern to set the processing condition along the determined pattern.

14 Claims, 18 Drawing Sheets

(56) References Cited

U.S. PATENT DOCUMENTS

| | | | |
|---|---|---|---|
| 2015/0319078 A1* | 11/2015 | Lee .................... | H04L 12/6418 |
| | | | 370/392 |
| 2016/0119198 A1 | 4/2016 | Kfir et al. | |
| 2016/0301579 A1* | 10/2016 | Djukic ................ | H04L 41/5009 |
| 2017/0041201 A1* | 2/2017 | Ilyadis ................... | H04L 43/08 |
| 2017/0052809 A1* | 2/2017 | Kano .................. | G06F 9/45558 |
| 2018/0270113 A1* | 9/2018 | Nainar ................ | H04L 41/0813 |

* cited by examiner

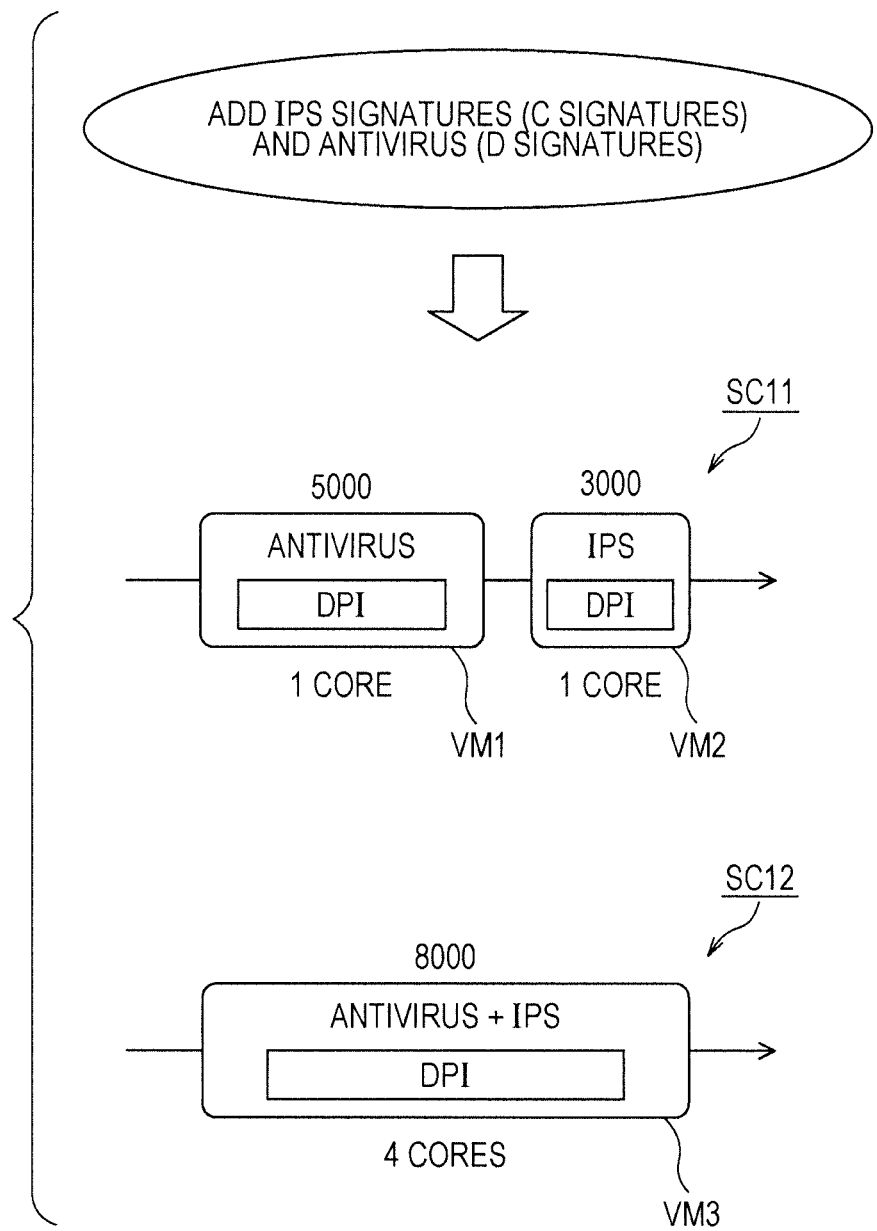

CONSTRAINTS ON GENERATION OF SERVICE CHAIN SC1

$$p_1^1 = \sum_c x_{A,c}^1 \quad \cdots (11) \qquad p_1^1 = \sum_c \left\{ x_{B,c}^1 + x_{B,c}^{1+2} \right\} \quad \cdots (12)$$

$$p_2^1 = \sum_c x_{(A+B),c}^1 \quad \cdots (13)$$

$$p_1^1 + p_2^1 = 1 \quad \cdots (14)$$

$$T^1 \leq \sum_c F(S_{A,c}) \cdot x_{A,c}^1 \quad \cdots (15)$$

$$T^1 \leq \sum_c F(S_{B,c}) \cdot x_{B,c}^1 \quad \cdots (16)$$

$$T^1 \leq \sum_c F(S_{A+B,c}) \cdot x_{(A+B),c}^1 \quad \cdots (17)$$

CONSTRAINTS ON GENERATION OF SERVICE CHAIN SC2

$$p_1^2 = \sum_c \left\{ x_{B,c}^2 + x_{B,c}^{1+2} \right\} \quad \cdots (21) \qquad p_1^2 = \sum_c x_{C,c}^2 \quad \cdots (22)$$

$$p_2^2 = \sum_c x_{B+C,c}^2 \quad \cdots (23)$$

$$p_1^2 + p_2^2 = 1 \quad \cdots (24)$$

$$T^2 \leq \sum_c F(S_{B,c}) \cdot x_{B,c}^2 \quad \cdots (25)$$

$$T^2 \leq \sum_c F(S_{C,c}) \cdot x_{C,c}^2 \quad \cdots (26)$$

$$T^2 \leq \sum_c F(S_{B+C,c}) \cdot x_{(B+C),c}^2 \quad \cdots (27)$$

SHARED CONSTRAINT OF FUNCTION B $$T^1 + T^2 \leq \sum_c F(S_{B,c}) \cdot x_{B,c}^{1+2} \quad \cdots (31)$$

CONTROL APPARATUS AND PROCESSING METHOD FOR CONTROL APPARATUS

CROSS-REFERENCE TO RELATED APPLICATION

This application is based upon and claims the benefit of priority of the prior Japanese Patent Application No. 2016-139338, filed on Jul. 14, 2016, the entire contents of which are incorporated herein by reference.

FIELD

The embodiments discussed herein are related to a control apparatus and to a processing method for the control apparatus to design a communication path.

BACKGROUND

In order to suppress increase in capital investment and operational management cost associated with increase in traffic, techniques such as software-defined networking (SDN) and network functions virtualization (NFV) have been attracting attention in recent years. SDN is a technique to enable software to make communication settings for general-purpose switches. Meanwhile, NFV is a technique to allow a server for general purpose use to execute software for performing the same processing as that provided by devices such as a firewall and a load balancer. Such techniques may implement various kinds of processing by using general-purpose hardware and software. Thus, cost reduction may be expected, and processing performed in a transfer path may be also made to offer higher functions.

In an NFV system, applications are executed by a server that builds NFV. The applications executed by the server are used to implement virtualized network functions (VNF). Furthermore, the NFV system also includes an NFV orchestrator that controls the NFV system. In the NFV system, virtual machines (VM) started on the server in response to a request from a user may provide network functions requested by the user by executing the applications while being connected to each other.

SDN/NFV use cases include a service chain. In the service chain, when the user performs communication, a carrier builds network security devices such as a firewall, an antivirus, and an intrusion prevention device on a cloud and provides such devices as network services.

FIG. 1 is a diagram illustrating an example of a service chain. A carrier holds a data center 5 in a wide area network 3. Upon receipt of a request from a user, a control apparatus 6 uses physical servers 8 (8a to 8f) in the data center 5 to generate a service chain for establishing a requested communication path. For example, the control apparatus 6 receives, from a company 2a, a request for setting of a path to the Internet 4 through a uniform resource locator (URL) filter, an intrusion prevention device, and a firewall. Then, in response to the request, the control apparatus 6 causes the physical servers 8 in the data center 5 to start a virtual machine, and uses the started virtual machine to generate a service chain (arrow A) having a function requested by the company 2a. Meanwhile, a company 2b requests the control apparatus 6 to generate a path for communication with a base 7 through an antivirus and a firewall. Then, the control apparatus 6 uses a virtual machine started by the physical servers 8 to generate a service chain indicated by arrow B. In such a service, a throughput service level agreement (SLA) is often made for the service chain of the user. Such a throughput SLA desires performance guarantee of the service chain.

As a related technique, a management method has been proposed in which resource usage states and process execution states in distributed agents are acquired and, when the acquired information does not meet the processing target values and constraints on resource specifications, the resources are reallocated (see, for example, Japanese Laid-open Patent Publication No. 2012-074056). There has also been proposed a method in which a coprocessor performs analysis in an application layer on original data packets transmitted by a general-purpose processor, and the general-purpose processor performs processing based on the analysis result obtained by the coprocessor (see, for example, Japanese National Publication of International Patent Application No. 2015-537278).

SUMMARY

According to an aspect of the invention, a control apparatus includes a memory, and a processor coupled to the memory and the processor configured to receive a request to generate a communication path, calculate patterns in each of which a plurality of processing conditions for use in processing to be performed by communication devices arranged on the communication path are assigned to the communication devices usable to generate the communication path, determine a determined pattern for use in setting of a processing condition of the plurality of processing conditions from the calculated patterns, based on estimation information for associating a number of processing conditions with an estimated value of a throughput, the number of processing conditions and the estimated value of the throughput being set for the communication devices, and transmit a control packet to request each of the communication devices used in the determined pattern to set the processing condition along the determined pattern.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 10 is a diagram illustrating an example of adding signatures;

FIG. 13 is a diagram illustrating a setting example of constraint conditions according to the third embodiment;

DESCRIPTION OF EMBODIMENTS

Figure 1:
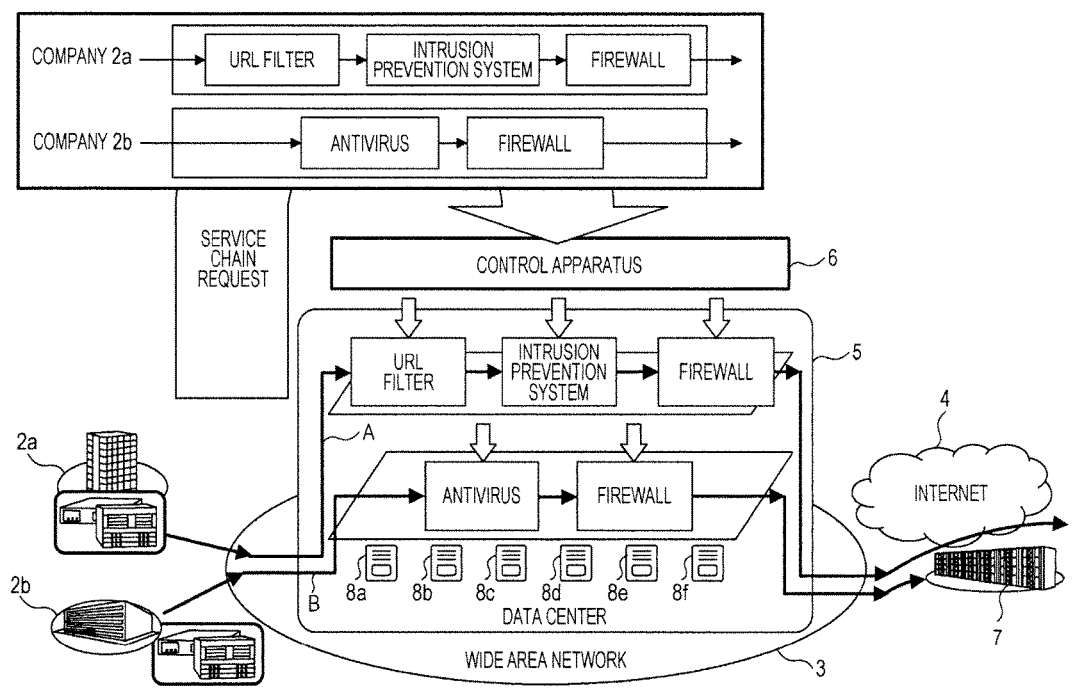
FIG. 1 is a diagram illustrating an example of a service chain.

In FIG. 1, the control apparatus 6 often assigns one VNF to each virtual machine in the service chain and then allocates resources of a central processing unit (CPU) core and the like included in the physical server 8, whose amount exceeds an amount of the resources for use to implement the VNF assigned to the virtual machine. In this case, each virtual machine in the service chain occupies excessive resources with which the virtual machine may execute not only the VNF assigned to the virtual machine, but also other processing. Therefore, the physical servers 8 in the system are not efficiently used. Such a problem may also occur when a system is generated by assigning predetermined processing to a hardware device.

Hereinafter, with reference to the drawings, description is given of an embodiment of a technique capable of designing an efficient communication system.

Figure 2:
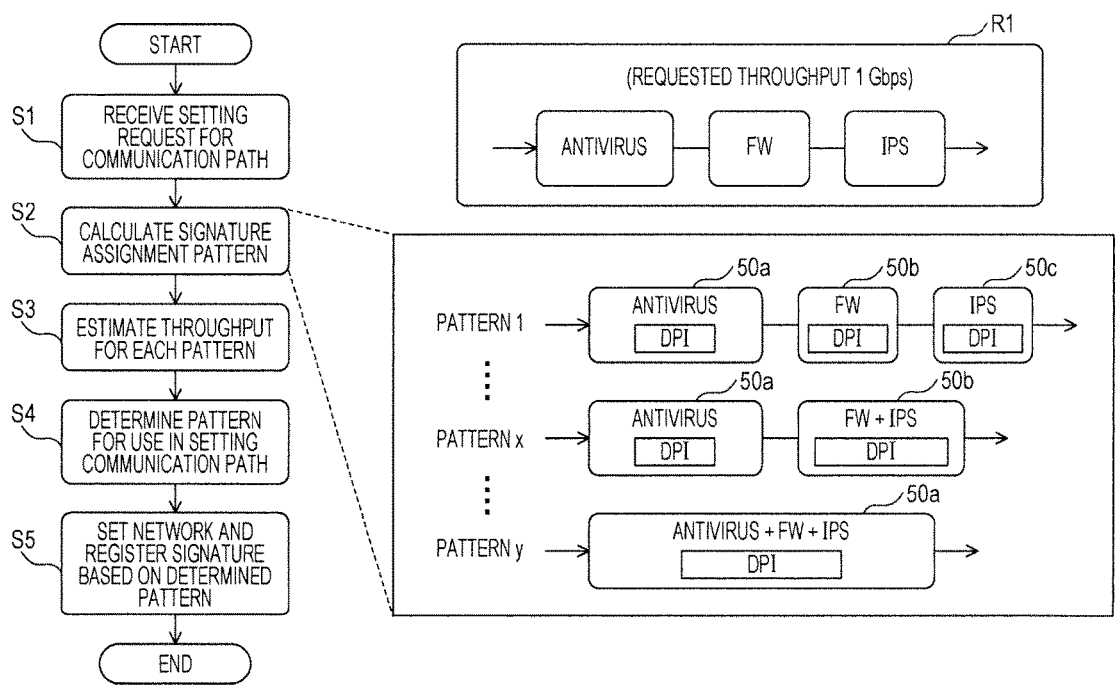
FIG. 2 is a diagram illustrating an example of a design method according to an embodiment.

FIG. 2 is a diagram illustrating an example of a design method according to an embodiment. A control apparatus 10 (see FIG. 3) that performs the design method according to the embodiment receives a setting request for a communication path from a user terminal or the like (Operation S1). The communication path includes a service chain. The control apparatus 10 specifies a throughput and kinds of network functions requested in the received setting request. For example, as indicated by R1 in FIG. 2, the setting request includes an antivirus, a firewall (FW), and an intrusion prevention system (IPS) as the network functions. Further, the service chain request R1 is a request for a throughput of 1 Gbps.

In the following description, the network functions used to maintain security are all implemented by a combination of deep packet inspection (DPI) and filtering. A communication device previously holds illegal codes (signatures) as information to be used in DPI processing, and discards illegal packets based on a result of comparison between inputted packets and the signatures. Therefore, processing to be implemented by the network functions may be selected depending on which signature is to be registered. Here, information to be registered with one communication device as the signature may be only a signature to implement one function or may be a combination of signatures to implement multiple functions. Alternatively, a part of a signature to implement one function may be registered with one communication device.

In Operation S2, the control apparatus 10 calculates a signature assignment pattern to a communication device 50 that may be used for a communication path. In this event, the control apparatus 10 obtains all possible patterns in executing the functions requested in the setting request R1, as the signature assignment patterns to the communication device 50. Here, patterns having different numbers of the communication devices 50 for use in generating a communication path are also obtained as the signature assignment patterns.

For example, when the setting request is as indicated by R1, the control apparatus 10 obtains various patterns from a pattern 1 to a pattern y. The pattern 1 is a pattern using three communication devices 50 (50a to 50c). In the pattern 1, a signature for executing the antivirus is set in the communication device 50a, a signature for executing the FW is registered with the communication device 50b, and a signature for executing the IPS is registered with the communication device 50c. A pattern x is a pattern when using the communication device 50a and the communication device 50b. In the pattern x, the signature for executing the antivirus is set in the communication device 50a, and the signatures for executing the FW and the IPS are registered with the communication device 50b. Furthermore, in a pattern y, the signatures for executing all the antivirus, FW, and IPS are set in the communication device 50a.

Once the signature assignment patterns are determined, the control apparatus 10 estimates a throughput in the case of using each pattern (Operation S3). In this event, the control apparatus 10 previously holds the number of signatures to be processed by each virtual machine and throughput data for calculating a predicted value of throughput to be obtained. For each of the patterns thus obtained, the control apparatus 10 calculates a predicted value of throughput to be obtained when the communication device 50 included in the pattern executes signatures to be registered with the communication device 50, and sets the lowest value among the predicted values as the estimated throughput.

After estimating the throughput for each pattern, the control apparatus 10 determines a pattern for use in setting a communication path by using the estimated throughput (Operation S4). For example, the control apparatus 10 may select patterns with the estimated value of throughput not less than the throughput requested by the user, from among the signature assignment patterns, and then determine a pattern with the smallest amount of resources to be used from among the selected patterns. Here, the amount of resources may be the number of the communication devices 50. Alternatively, when the communication devices 50 are executed as virtual machines, the amount of resources may be the number of central processing unit (CPU) cores used to implement each virtual machine, the capacity of a memory for use in processing by each virtual machine, or the like. The control apparatus 10 sets a communication path and registers the signatures with the communication device 50 based on the determined pattern (Operation S5).

As described above, in the design method according to the embodiment, settable signature assignment patterns are calculated, including patterns other than those in the case of implementing one network function with one communication device 50. Therefore, the control apparatus 10 may select a pattern for use in designing a path from among candidates also including a pattern in which one communication device 50 implements more than one VNF and a pattern in which one VNF is implemented by more than one communication device 50. This makes it easier to find the signature assignment for efficient use of the communication devices 50 and to efficiently set the communication system, compared with the case where one VNF is assigned to each communication device 50.

Note that, although the above description is given of, as an example, the case of using the communication devices 50, the communication devices 50 may be either the virtual machines or the physical servers 8. When the communication devices 50 are the physical servers 8, a network capable of implementing security functions may be designed by setting signatures for each of the physical servers 8 used as the communication devices 50.

<Apparatus Configuration>

Figure 3:
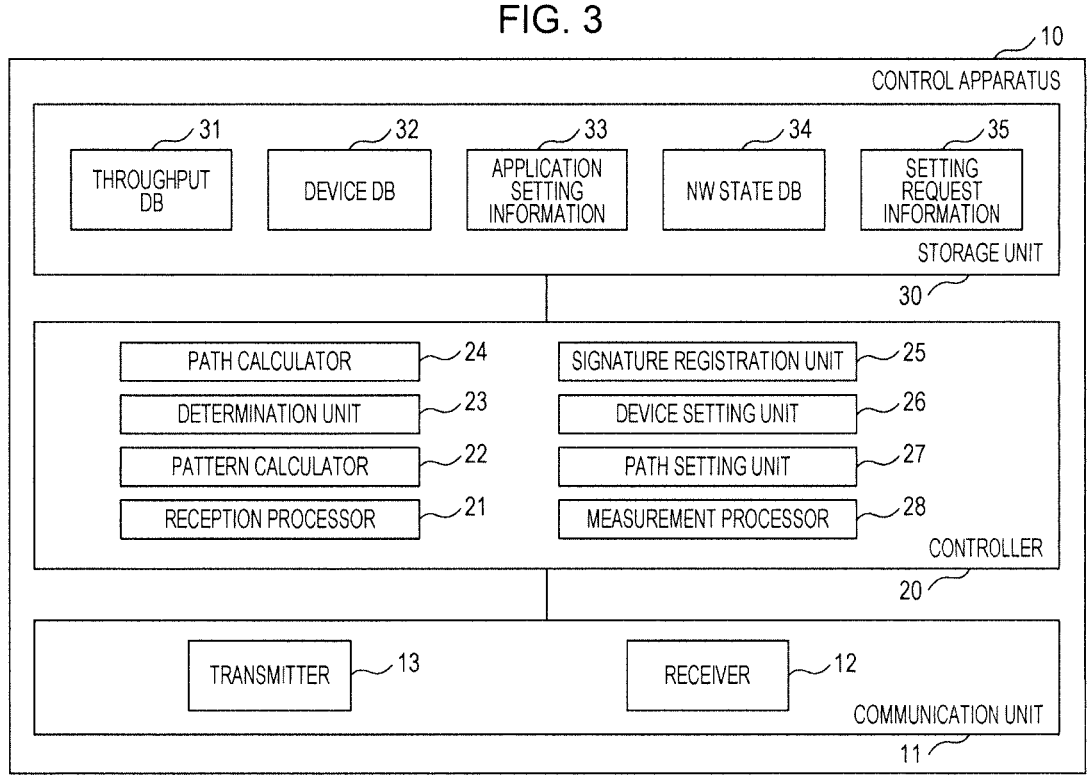
FIG. 3 is a diagram illustrating a configuration example of a control apparatus.

FIG. 3 is a diagram illustrating an example of a configuration of the control apparatus 10. The control apparatus 10 includes a communication unit 11, a controller 20, and a storage unit 30. The communication unit 11 includes a receiver 12 and a transmitter 13. The controller 20 includes a reception processor 21, a pattern calculator 22, a determination unit 23, a path calculator 24, a signature registration unit 25, a device setting unit 26, and a path setting unit 27. The controller 20 also optionally includes a measurement processor 28. The storage unit 30 stores a throughput database 31, a device database 32, an application setting information 33, a NW state database 34, and setting request information 35.

Figure 6:
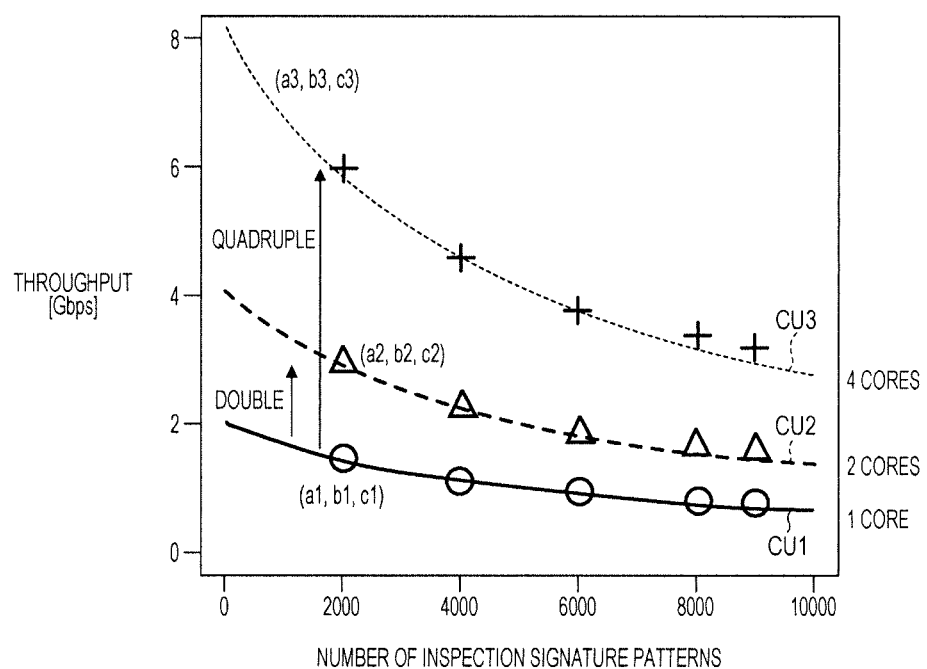
FIG. 6 is a graph illustrating a relationship between the number of signatures and a throughput.

The throughput database 31 represents a relationship between the number of signatures and a predicted value of throughput to be obtained. An example of the throughput database 31 is described later (FIG. 6). The application setting information 33 is setting information of each application to be executed by the virtual machine, and includes the number of signatures included in each application. Note that the application setting information 33 may be accordingly updated with control information sent from a provider of security functions or a management terminal used by an operator. For example, when a new virus is found, a signature for responding to the new virus is added, and the control apparatus 10 receives the update of the application setting information 33 together with the signature information. The device database 32 holds states of the respective virtual machines implemented by the physical servers 8. The device database 32 may include, for example, information indicating whether the virtual machine is running, information of how many CPU cores are allocated to each virtual machine, and the like. The NW state database 34 includes connection status and path information between the virtual machines.

The setting request information 35 includes information about a service chain that is being generated. The setting request information 35 includes information such as the kinds of the network functions requested, a throughput requested by the user, and a source of a service chain request, for example. Note that, when the control apparatus 10 concurrently processes multiple service chain requests, the setting request information 35 may include identification information capable of specifying individual service chains that are being processed. In this case, processing by the controller 20 is performed corresponding to the identification information for each service chain request.

The receiver 12 receives packets from the user terminal and the physical servers 8 in the data center 5. The transmitter 13 transmits packets to the user terminal and the physical servers 8 in the data center 5.

The reception processor 21 acquires a service chain request through the receiver 12. The reception processor 21 records information in the service chain request in the setting request information 35. The pattern calculator 22 calculates signature assignment patterns by accordingly referring to the setting request information 35. The determination unit 23 obtains an estimated value of throughput, for each of the patterns calculated by the pattern calculator 22, by using the information in the throughput database 31. Then, the determination unit 23 determines a pattern that satisfies the throughput requested by the user and has the smallest amount of resources for use in generating a service chain. Note that, if there is more than one appropriate pattern, the determination unit 23 determines that a pattern with a relatively high throughput to be obtained is to be used for designing the service chain.

The path calculator 24 calculates a communication path between the virtual machines used in designing the service chain along the pattern determined by the determination unit 23. The path calculator 24 stores the path information obtained by calculation as the NW state database 34. The device setting unit 26 starts up the virtual machines and also updates the device database 32 according to the status of each virtual machine. The signature registration unit 25 registers the signatures with the started virtual machine along the pattern determined by the determination unit 23. Once the virtual machines are started, the path setting unit 27 sets a path by using the NW state database 34.

The control apparatus 10 including the measurement processor 28 accordingly measures a throughput during the execution of communication processing using the service chain. The measurement processor 28 updates the throughput database 31 by registering a combination of the number of signatures and an actual measured value of throughput in the throughput database 31.

Figure 4:
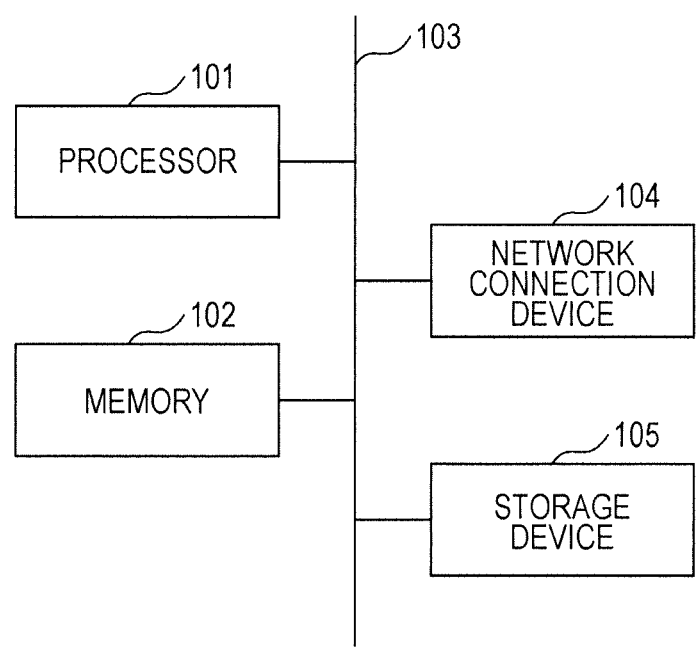
FIG. 4 is a diagram illustrating an example of a hardware configuration of the control apparatus.

FIG. 4 is a diagram illustrating an example of a hardware configuration of the control apparatus 10. The control apparatus 10 includes a processor 101, a memory 102, a bus 103, a network connection device 104, and a storage device 105. The processor 101 is any processing circuit, and may be a CPU. The memory 102 includes a random access memory (RAM) and a read only memory (ROM). The processor 101 may execute programs stored in the memory 102 and the storage device 105. The bus 103 connects the processor 101, the memory 102, the network connection device 104, and the storage device 105 to each other in a data transmittable and receivable manner. The network connection device 104 executes input and output of information to and from other devices in the network. The network connection device 104 is implemented as, for example, a network interface card (NIC). In the control apparatus 10, the processor 101 operates as the controller 20. The memory 102 and the storage device 105 operate as the storage unit 30. The network connection device 104 implements the communication unit 11, and the processor 101 may operate as the controller 20 including the communication unit 11.

The control apparatus 10 may optionally include one or more of an input device, an output device, and a portable storage medium drive unit. The input device is any device used to input information, such as a keyboard, and the output device is any device used to output data, such as a display. The portable storage medium drive unit may output data in the memory 102 and the storage device 105 to a portable storage medium, and may also read programs, data, and the like from the portable storage medium. Here, the portable storage medium is any storage medium that is portable.

First Embodiment

In a first embodiment, description is given of an example where virtual machines are used as the communication devices 50 and setting of a service chain is requested. Therefore, a request to generate a service chain is used as a request to set a communication path. Each of the virtual machines in the service chain performs processing for implementing VNF requested for the service chain. First, prior to description of an example of processing performed in the first embodiment, the throughput database 31 held in the control apparatus 10 is described with reference to FIGS. 5 and 6.

(A) Processing Example of VNF and Example of Throughput Database 31

Figure 5:
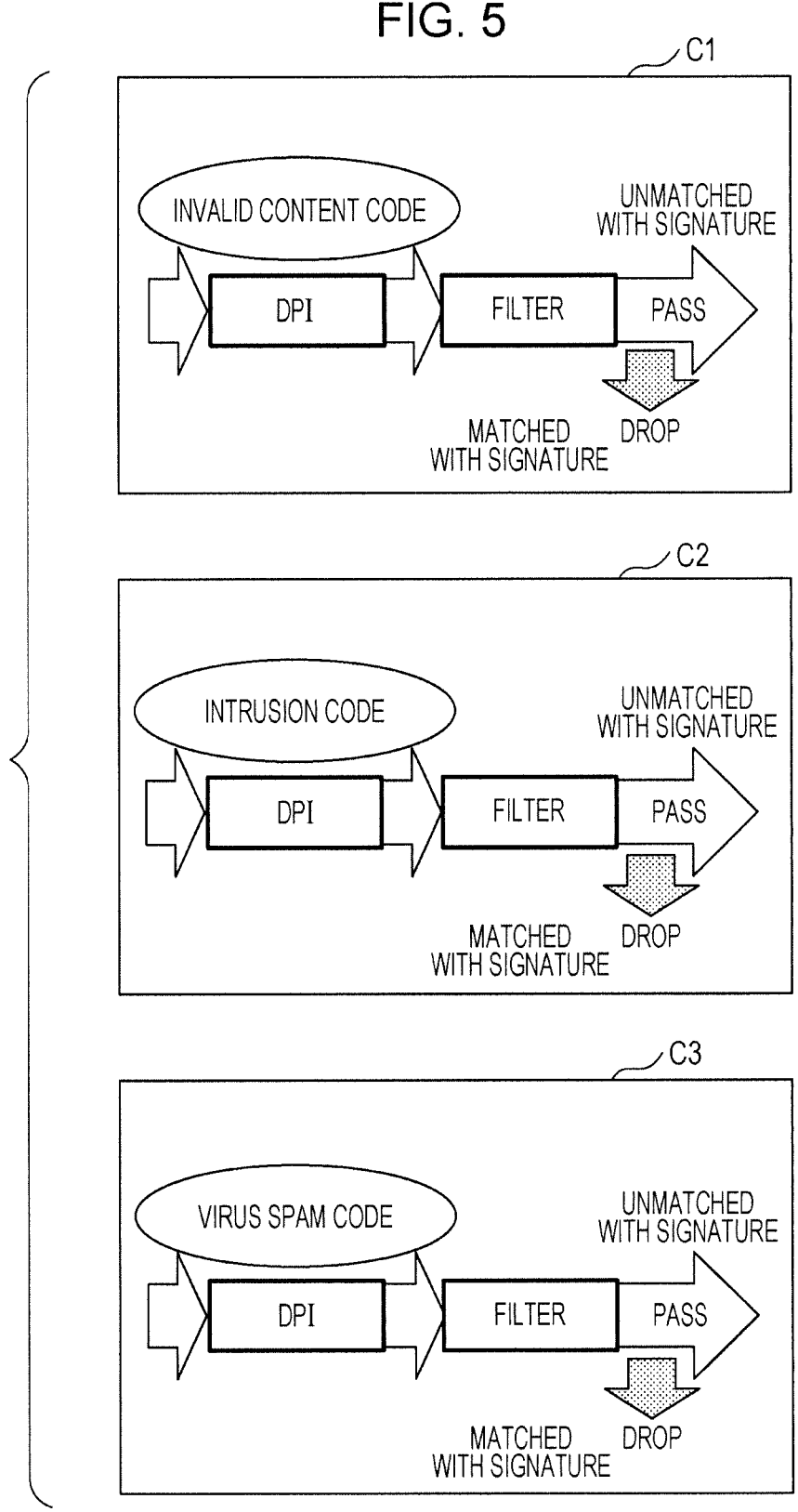
FIG. 5 is a diagram illustrating an example of processing performed in a service chain.

FIG. 5 is a diagram illustrating an example of processing performed in a service chain. In the example of FIG. 5, VNF requested for the service chain is a security function. In the following description, as illustrated in FIG. 5, network functions are all implemented by virtual machines that perform DPI and filtering. Various processing conditions are registered with DPI depending on contents of processing implemented by the network functions. A case C1 is a processing example where URL filtering is performed. Illegal content codes are registered with the virtual machine that performs URL filtering, as signatures to be used in DPI. In the case C1, the virtual machine to perform DPI compares an inputted packet to the signatures. When the inputted packet includes information matched with any of the signatures, the virtual machine discards the packet. On the other hand, when the inputted packet does not include any of the illegal content codes registered as the signatures, the virtual machine transfers the inputted packet to a transfer destination in the service chain.

A case C2 is a processing example of intrusion prevention performed by the virtual machine. Intrusion codes are registered with the virtual machine that performs intrusion prevention processing, as signatures to be used in DPI. In the case C2, again, the virtual machine to perform DPI compares an inputted packet to the signatures, and discards the inputted packet including information matched with any of the signatures. On the other hand, when the inputted packet does not include any of the intrusion codes registered as the signatures, the virtual machine transfers the inputted packet to a transfer destination in the service chain.

A case C3 is a processing example of antivirus processing performed by the virtual machine. Virus and spam codes are registered with the virtual machine that performs the antivirus processing, as signatures to be used in DPI. In the case C3, again, the virtual machine to perform DPI compares an inputted packet to the signatures, and discards the inputted packet including information matched with any of the signatures. On the other hand, when the inputted packet does not include any of the virus and spam codes registered as the signatures, the virtual machine transfers the inputted packet to a transfer destination in the service chain.

As described with reference to the cases C1 to C3 in FIG. 5, VNF in the service chain are implemented by DPI and filtering using the signatures registered with the virtual machine that implements the VNF. Therefore, regardless of the kinds of signatures or the kinds of VNF, the larger the number of signatures to be processed by the virtual machine, the smaller the maximum value of throughput obtained by the virtual machine.

FIG. 6 is a graph illustrating a relationship between the number of signatures and the throughput. The horizontal axis of the graph illustrated in FIG. 6 represents the number of signatures registered with one virtual machine, while the vertical axis thereof represents a throughput limit obtained by the virtual machine. Here, the "throughput limit" of a certain virtual machine is a throughput value of the virtual machine in a state where no more throughput may be achieved. The control apparatus 10 previously holds the information of the graph illustrated in FIG. 6 as the throughput database 31. The graph of FIG. 6 is generated using actual measured values or simulated values of throughput obtained by a virtual machine when signatures as many as the number of signatures represented by the horizontal axis are registered with the virtual machine. The white circle plot represents the number of signatures set for a virtual machine implemented by using one CPU core and the throughput limit obtained by the virtual machine. When the throughput limit value is approximated to be inversely proportional to the number of signatures processed by the virtual machine, an approximate curve is expressed in Equation (1).

$$Sr = w \times D \times C/(a+b \times x) \quad (1)$$

Here, Sr is the throughput limit value, D is a value representing a transfer data size in bit units, and C is the number of CPU cores. a is a delay time for processing such as transmission and reception of packets to be transferred, and is a certain value that does not fluctuate with the number of signatures. b is a processing delay caused by processing using one signature. w is a weight parameter for tuning, which is influenced by a frame length or the like, for example.

Note that the throughput database 31 may record combinations of the number of signatures and the throughput for multiple points on the approximate curve. The throughput database 31 may also record the values a, b, and w in Equation (1) for the obtained approximate curve. Hereinafter, the values a, b, and w used to specify the approximate curve may be described in this order in parentheses, such as (a, b, w). The following description is provided for the case where an approximate curve CU1 where (a, b, w)=(a1, b1, w1) is obtained when a virtual machine implemented by using one CPU core is used.

The white triangle plot represents a relationship between the number of signatures set for a virtual machine and the maximum value of throughput obtained by the virtual machine when two CPU cores are allocated to the virtual machine. As for the white triangle plot, again, an approximate curve CU2 indicated by the thick dashed line is obtained by using Equation (1). In the approximate curve CU2 obtained by using the white triangle plot, (a, b, w)=(a2, b2, w2) holds.

The cross plot represents a relationship between the number of signatures set for a virtual machine and the maximum value of throughput obtained by the virtual machine when four CPU cores are allocated to the virtual machine. As for the cross plot, again, an approximate curve CU3 indicated by the thin dashed line is obtained by using Equation (1). In the approximate curve CU3 obtained by using the cross plot, (a, b, w)=(a3, b3, w3) holds.

Here, comparing the approximate curves thus obtained illustrates that the larger the number of the CPU cores allocated to the virtual machines, the larger the throughput limit value obtained by the virtual machine. For example, with the same number of signatures to be processed, a throughput obtained by a virtual machine with two CPU cores is two times larger than that obtained by a virtual machine with one CPU core. Likewise, with the same number of signatures to be processed, a throughput obtained by a virtual machine with four CPU cores is four times larger than that obtained by the virtual machine with one CPU core.

(B) Processing Upon Receipt of Generation Request

Hereinafter, description is given of an example of processing performed by the control apparatus 10 upon receipt of a request to generate a service chain. The processing is described separately divided into calculation of patterns, calculation of an estimated value of throughput, determination of a pattern to be applied, and setting processing. Note that the following description is given of, as an example, processing by the control apparatus 10 without the measurement processor 28.

(B1) Calculation of Patterns

First, the receiver 12 in the control apparatus 10 receives a request to generate a service chain. The reception processor 21 acquires the request to generate a service chain, and then specifies VNF to be implemented by virtual machines included in the service chain. In the following example, an antivirus, a firewall, and an IPS are included in the service chain. The reception processor 21 stores the request to generate a service chain in the setting request information 35.

Upon update of the setting request information 35, the pattern calculator 22 starts calculation of patterns to generate a newly requested service chain. The pattern calculator 22 uses the application setting information 33 to specify the number of signatures of applications used to implement the VNF requested in the service chain. In the following example, the number of signatures used in the antivirus is 5000. Moreover, the number of signatures used in the firewall is 2000 and the number of signatures used in IPS is 3000. The pattern calculator 22 calculates applicable signature assignment patterns for each of the cases where the number of virtual machines included in the service chain is 1 and where the service chain includes virtual machines whose number is the same as that of VNF. Furthermore, the pattern calculator 22 also obtains the number of signatures to be registered with each of the virtual machines in each of the assignment patterns by using the number of signatures used to implement each of the VNF.

Figure 7:
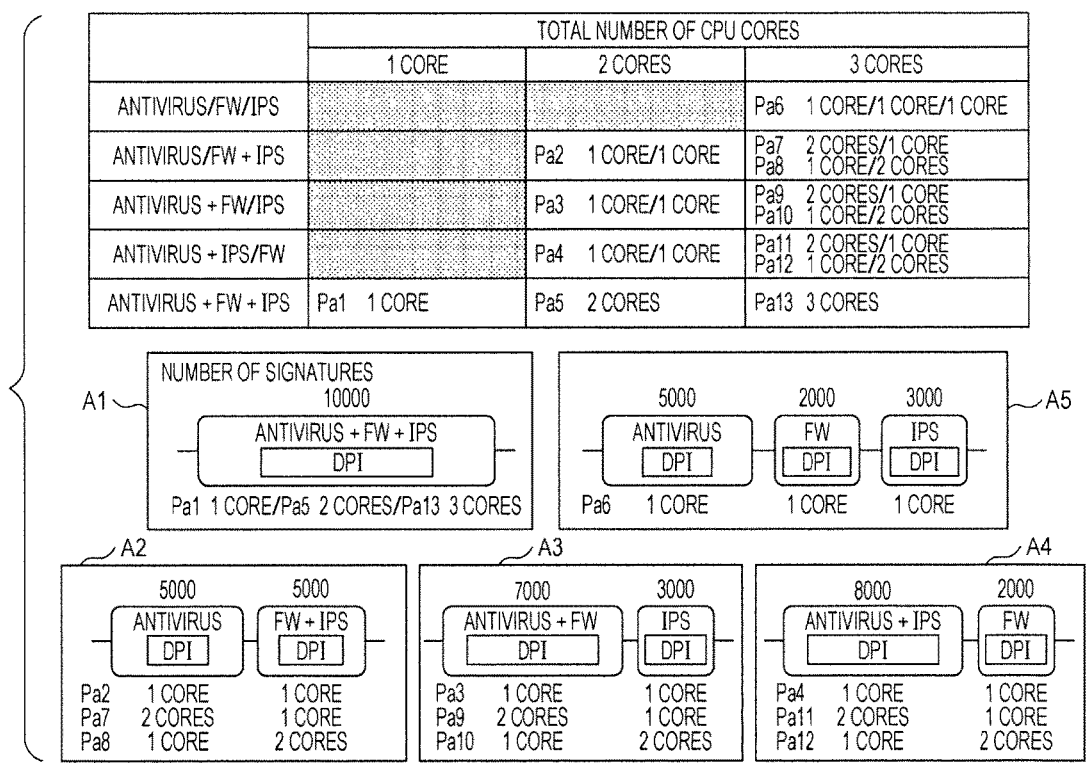
FIG. 7 is a diagram illustrating an example of combinations of assignment patterns and the numbers of CPU cores.

FIG. 7 is a diagram illustrating an example of combinations of the assignment patterns and the numbers of the CPU cores. FIG. 7 illustrates an example of a case where one service chain includes three VNF, that is, an antivirus, a firewall (FW), and an IPS, and it is specified that antivirus is to be applied first. In this case, as an assignment pattern for the case of using one virtual machine, the pattern calculator 22 obtains a pattern in which the antivirus, the firewall, and the IPS are all implemented by the same virtual machine as indicated by A1 in FIG. 7. In the assignment pattern A1, signatures to be used for processing of antivirus, firewall, and IPS are registered with one virtual machine. Thus, 5000+3000+2000=10000 signatures are registered.

The pattern calculator 22 calculates A2 to A4 in FIG. 7 as assignment patterns for the case of using two virtual machines. In the assignment pattern A2, the antivirus is implemented by one virtual machine, and the firewall and the IPS are implemented by one virtual machine. Therefore, in the assignment pattern A2, 5000 signatures are registered with the virtual machine to perform the antivirus processing. Meanwhile, 3000+2000=5000 signatures are also registered with the virtual machine that operates as the firewall and the IPS.

In the assignment pattern A3, the antivirus and the firewall are implemented by one virtual machine, and the IPS is implemented by one virtual machine different from the virtual machine that implements antivirus and the like. In the assignment pattern A3, 5000+2000=7000 signatures are registered with the virtual machine that operates as the antivirus and the firewall. Meanwhile, 3000 signatures are registered with the virtual machine that operates as the IPS.

In the assignment pattern A4, the antivirus and the IPS are implemented by one virtual machine, and the firewall is implemented by one virtual machine different from the virtual machine that implements the antivirus and the like. In the assignment pattern A4, 5000+3000=8000 signatures are registered with the virtual machine that operates as the antivirus and the IPS. Meanwhile, 2000 signatures are registered with the virtual machine that operates as the firewall.

As an assignment pattern for the case of using three virtual machines, the pattern calculator 22 obtains a pattern in which the antivirus, the firewall, and the IPS are individually implemented by different virtual machines as indicated by A5 in FIG. 7. In the assignment pattern A5, 5000 signatures are registered with the virtual machine that operates as the antivirus, 2000 signatures are registered with the virtual machine that operates as the firewall, and 3000 signatures are registered with the virtual machine that operates as the IPS.

As described in the first embodiment, when the communication devices 50 are implemented as the virtual machines, the number of CPU cores to be allocated to each of the virtual machines in the service chain may be changed in settings. Therefore, for each of the assignment patterns, the pattern calculator 22 obtains candidates for the number of CPU cores that may be used for each of the virtual machines. Hereinafter, a combination of the assignment pattern and the number of CPU cores allocated to each of the virtual machines included in the assignment pattern is described as a combination pattern. The combination pattern is obtained by associating the assignment pattern with the total number of CPU cores used in the service chain. The table in FIG. 7 illustrates combination patterns obtained when up to three CPU cores may be used to generate a service chain to be processed.

For the assignment pattern A1 in using one virtual machine, the pattern calculator 22 obtains combination patterns when the number of CPU cores allocated to the virtual machine is 1 to 3. The combination patterns obtained for the assignment pattern A1 are as given in the fifth entry in the table of FIG. 7. In the combination pattern Pa1, all the processing of the antivirus, the firewall, and the IPS is performed by the virtual machine with one CPU core. In the combination pattern Pa5, the processing of the antivirus, the firewall, and the IPS is performed by the virtual machine with two CPU cores. In the combination pattern Pa13, the processing of the antivirus, the firewall, and the IPS is performed by the virtual machine with three CPU cores.

For the assignment pattern A2, the pattern calculator 22 obtains combination patterns Pa2, Pa7, and Pa8 as given in the second entry in the table of FIG. 7. In the combination pattern Pa2, one CPU core is allocated to the virtual machine that performs the antivirus processing, and one CPU core is also allocated to the virtual machine that operates as the firewall and the IPS. In the combination pattern Pa7, two CPU cores are allocated to the virtual machine that performs the antivirus processing, and one CPU core is allocated to the virtual machine that operates as the firewall and the IPS. In the combination pattern Pa8, one CPU core is allocated to the virtual machine that performs the antivirus processing, and two CPU cores are allocated to the virtual machine that operates as the firewall and the IPS.

For the assignment pattern A3, the pattern calculator 22 obtains combination patterns Pa3, Pa9, and Pa10 as given in the third entry in the table of FIG. 7. In the combination pattern Pa3, one CPU core is allocated to the virtual machine that performs the processing of the antivirus and the firewall, and one CPU core is also allocated to the virtual machine that operates as the IPS. In the combination pattern Pa9, two CPU cores are allocated to the virtual machine that performs the processing of the antivirus and the firewall, and one CPU core is allocated to the virtual machine that operates as the IPS. In the combination pattern Pa10, one CPU core is allocated to the virtual machine that performs the processing of the antivirus and the firewall, and two CPU cores are allocated to the virtual machine that operates as the IPS.

For the assignment pattern A4, the pattern calculator 22 obtains combination patterns Pa4, Pa11, and Pa12 as given in the fourth entry in the table of FIG. 7. In the combination pattern Pa4, one CPU core is allocated to the virtual machine that performs the processing of the antivirus and the IPS, and one CPU core is also allocated to the virtual machine that operates as the firewall. In the combination pattern Pa11, two CPU cores are allocated to the virtual machine that performs the processing of the antivirus and the IPS, and one CPU core is allocated to the virtual machine that operates as the firewall. In the combination pattern Pa12, one CPU core is allocated to the virtual machine that performs the processing of the antivirus and the IPS, and two CPU cores are allocated to the virtual machine that operates as the firewall.

For the assignment pattern A5 using three virtual machines, the pattern calculator 22 obtains a combination pattern Pa6 as given in the first entry in the table of FIG. 7. In the combination pattern Pa6, one CPU core is allocated to each of the virtual machines that operate as the antivirus, the firewall, and the IPS, respectively.

(B2) Calculation of Estimated Value of Throughput

Upon completion of the calculation of the combination patterns by the pattern calculator 22, the determination unit 23 obtains an estimated value of throughput, by using the throughput database 31, for each of the combination patterns thus obtained. For example, the approximate curves illustrated in FIG. 6 are stored in the throughput database 31. Then, the determination unit 23 obtains an estimated value of throughput for each virtual machine by using the approximate curve corresponding to the number of CPU cores allocated to each virtual machine. As for the combination pattern including more than one virtual machine, the determination unit 23 obtains estimated values of throughput for the respective virtual machines, and sets the minimum value among the estimated values as the throughput estimated for the combination pattern.

For example, in the combination pattern Pa1, one CPU core performs processing of signatures. Thus, the determination unit 23 uses the approximate curve CU1 in FIG. 6 to obtain an estimated value of throughput in the combination pattern Pa1. In the approximate curve CU1, variables in Equation (1) are (a, b, w)=(a1, b1, w1). Therefore, an estimated throughput (Sr_Pa1) for Pa1 is calculated by Equation (2). Note that, in the combination pattern Pa1, the number of CPU cores (C) is 1 and the number of signatures (x) to be processed is 10000.

$$Sr\_Pa1 = w1 \times D \times C/(a1 + b1 \times x) \quad (2)$$
$$= w1 \times D \times 1/(a1 + b1 \times 10000)$$

It is assumed that the value Sr_Pa1=0.65 Gbps is obtained by the calculation in Equation (2).

Figure 8:
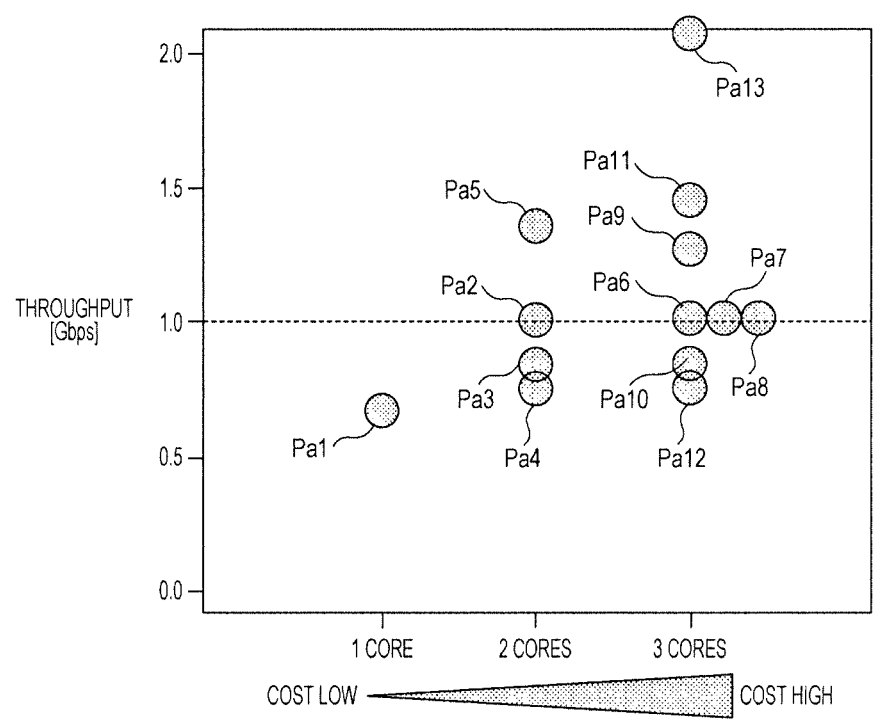
FIG. 8 is a diagram illustrating a calculation example of a throughput obtained in each combination.

FIG. 8 illustrates estimated values of throughput obtained for the respective combinations, each being associated with the total number of CPU cores used in each combination. The plot of Pa1 in FIG. 8 represents the estimated value of throughput calculated for the combination pattern Pa1.

In the combination patterns Pa2 to Pa4 among those for the case of using two CPU cores, one CPU core is allocated to each of two virtual machines. Therefore, in the combination patterns Pa2 to Pa4, an estimated values of throughput for each virtual machine is obtained by using the approximate curve CU1, as in the case of the combination pattern Pa1. For example, in the virtual machine that operates as both of the antivirus and the IPS in the combination pattern Pa4, the number of CPU cores (C) is 1 and the number x of signatures to be processed is 8000. Therefore, an estimated throughput (Sr_VM1) for the virtual machine that operates as both of the antivirus and the IPS in Pa4 is calculated by Equation (3).

$$Sr\_VM1 = w1 \times D \times C/(a1 + b1 \times x) \quad (3)$$
$$= w1 \times D \times 1/(a1 + b1 \times 8000)$$

It is assumed that the value Sr_VM1=0.8 Gbps is obtained by the calculation in Equation (3).

Meanwhile, in the virtual machine that operates as the firewall in the combination pattern Pa4, the number of CPU cores (C) is 1 and the number x of signatures to be processed is 2000. Therefore, an estimated throughput (Sr_VM2) for the virtual machine that operates as the firewall in Pa4 is calculated by Equation (3).

$$Sr\_VM2 = w1 \times D \times C/(a1 + b1 \times x) \quad (4)$$
$$= w1 \times D \times 1/(a1 + b1 \times 2000)$$

It is assumed that the value Sr_VM2=1.6 Gbps is obtained by the calculation in Equation (4). Then, since Sr_VM1 is lower than Sr_VM2, the determination unit 23 adopts the value Sr_VM1 (0.8 Gbps) as the estimated value of throughput in the combination pattern Pa4.

For the combination patterns Pa2 and Pa3, the determination unit 23 also performs the same processing as that for the combination pattern Pa4. Pa2 to Pa4 in FIG. 8 represents the estimated values of throughput obtained as the result of the processing for the combination patterns Pa2 to Pa4.

In the combination pattern Pa5, two CPU cores are used in one virtual machine. Therefore, the determination unit 23 uses the approximate curve CU2 to estimate throughput. In the approximate curve CU2, variables in Equation (1) are (a, b, w)=(a2, b2, w2). Therefore, an estimated throughput (Sr_Pa5) for the combination pattern Pa5 is calculated by Equation (5). Note that, in the combination pattern Pa5, the number of CPU cores (C) is 2 and the number x of signatures to be processed is 10000.

$$Sr\_Pa5 = w2 \times D \times C/(a2 + b2 \times x) \quad (5)$$
$$= w2 \times D \times 2/(a2 + b2 \times 10000)$$

It is assumed that the value Sr_Pa5=1.3 Gbps is obtained by the calculation in Equation (5). Pa5 in FIG. 8 represents the estimated value of throughput Sr_Pa5.

In the combination patterns Pa6 to Pa12 among those in which the total number of CPU cores is 3, the number of CPU cores allocated to each virtual machine is 1 or 2. Therefore, the determination unit 23 obtains a throughput for each virtual machine by using the approximate curve CU1 for the virtual machine implemented by one CPU core and by using the approximate curve CU2 for the virtual machine implemented by two CPU cores. Thereafter, the determination unit 23 sets the minimum value of through obtained for each combination pattern as the estimated value. Pa6 to Pa12 in FIG. 8 represent the estimated values of throughput obtained for the combination patterns Pa6 to Pa12.

In the combination pattern Pa13, three CPU cores are used in one virtual machine. However, the throughput database 31 includes no approximate curve for the virtual machine with three CPU cores, as in FIG. 6. In this case, the determination unit 23 triples the estimated value of throughput obtained by using the approximate curve for the case of one CPU core. This is because, with the same number of signatures to be processed, the estimated value of throughput is increased proportional to the number of CPU cores used for the processing, as described with reference to FIG. 6. Pa13 in FIG. 8 represents the estimated value of throughput obtained for Pa13.

(B3) Determination of Pattern to be Applied

Once the estimated throughput for each of the combination patterns is obtained, the determination unit 23 selects the combination patterns with the estimated throughput not less than the throughput requested for the service chain, as combination candidates for use in setting. For example, the throughput requested for the service chain is 1 Gbps. In this case, the determination unit 23 selects the combination patterns Pa2, Pa5 to Pa9, Pa11, and Pa13 as the combination candidates for use in setting.

Next, the determination unit 23 selects the combination patterns with the small total number of CPU cores to be used, among the candidates thus obtained, as combinations for use in setting. In the example of FIG. 8, the combination patterns with a total of two CPU cores and with a total of three CPU cores are obtained as the combination patterns with the estimated throughput not less than the requested throughput. The larger the total number of CPU cores used to generate one service chain, the higher the cost for installation and maintenance of the service chain. Therefore, in the example of FIG. 8, the determination unit 23 selects the combination patterns Pa2 and Pa5, each with a total of two CPU cores. As in the example of FIG. 8, when more than one combination pattern is left as the candidate upon determination of combination patterns by using both of the conditions for the estimated throughput and the total number of CPU cores, the determination unit 23 adopts the combination with a larger estimated throughput. Therefore, in the example of FIG. 8, the determination unit 23 determines the combination pattern Pa5 as the combination pattern for use in setting the service chain.

(B4) Setting Processing

The determination unit 23 notifies the path calculator 24, the signature registration unit 25, and the device setting unit 26 of the combination pattern (determined pattern) for use in setting the service chain. The device setting unit 26 starts the virtual machines used in the determined pattern, and records the start-up statuses of the virtual machines, and the like in the device database 32. Note that the processing of starting the virtual machines may be performed using any known method.

The signature registration unit 25 monitors the start-up statuses of the virtual machines by using the device database 32. The signature registration unit 25 performs processing for registering signatures with a virtual machine whose start-up is confirmed, the signatures being associated with the virtual machine in the determined pattern. For example, the signature registration unit 25 transmits a control packet including signatures to be registered to the virtual machine as the processing target, thereby requesting the virtual machine as the processing target to register the signatures.

The path calculator 24 calculates a transfer path between the virtual machines, in order to implement the service chain specified by the determined pattern. The path calculator 24 acquires topology information and the like within the network by accordingly using the NW state database 34 to perform the path calculation. Any known method may be adopted as a method for calculating a path by the path calculator 24. The path calculator 24 outputs the calculated path information to the path setting unit 27. The path setting unit 27 performs processing for setting a transfer path between the virtual machines. For example, the path setting unit 27 transmits a control message including information of a path to be set to the virtual machine, thereby causing the virtual machine as the processing target to set a path. Through the above processing, the service chain requested by the user is generated.

Figure 9:
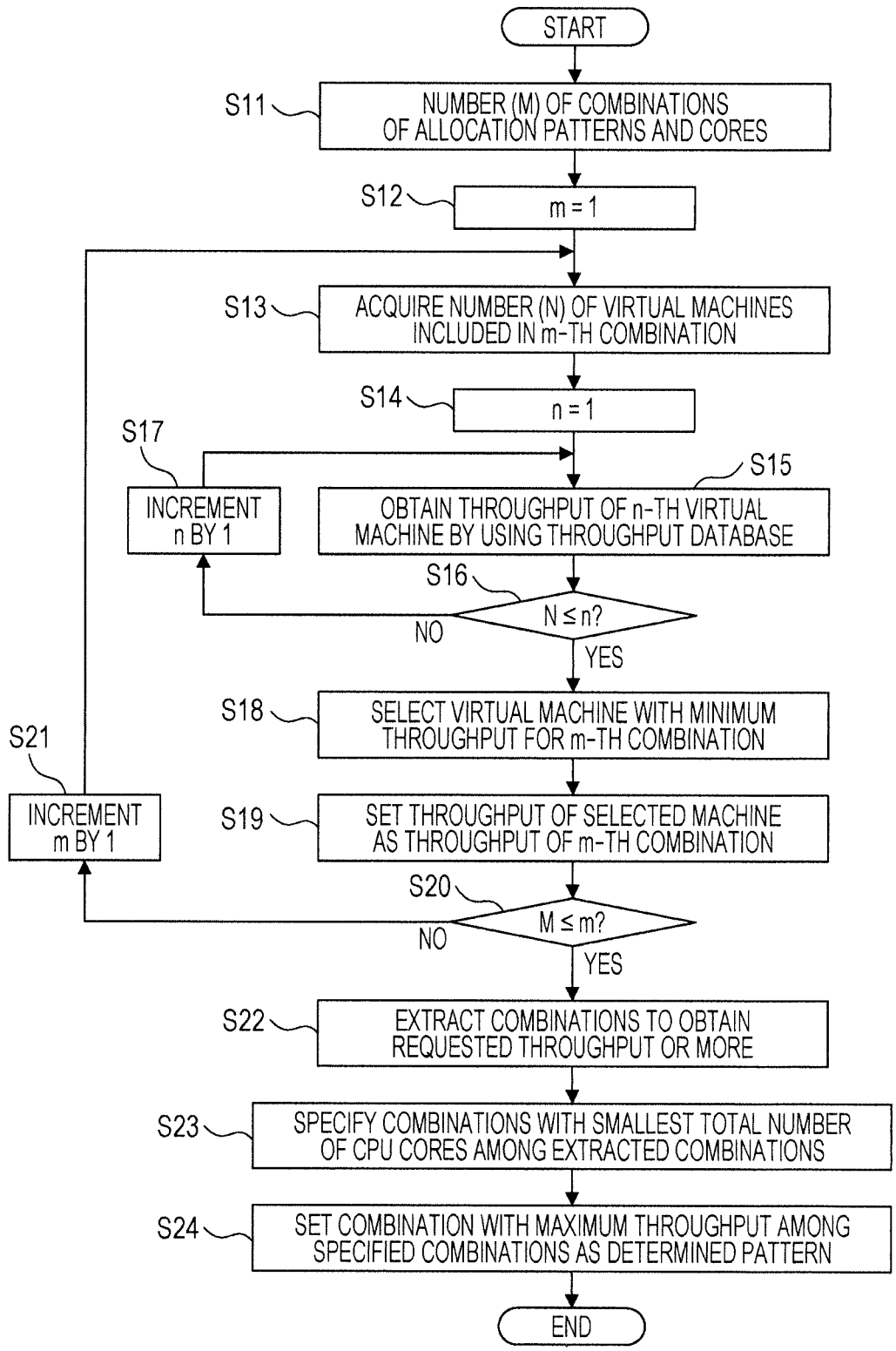
FIG. 9 is a flowchart illustrating an example of a design method according to a first embodiment.

FIG. 9 is a flowchart illustrating an example of a design method according to the first embodiment. The flowchart illustrated in FIG. 9 represents an example of processing of estimating a throughput and selecting a determined pattern for the combination patterns calculated by the pattern calculator 22. In FIG. 9, variables m and n are used. The variable m is used to count the number of combination patterns as processing targets, while the variable n is used to count the number of virtual machines as targets for throughput estimation processing. Note that, in FIG. 9, combination patterns are simply described as "combinations" due to the limited page space.

The determination unit 23 obtains the number of combinations of the assignment patterns calculated by the pattern calculator 22 and the CPU cores, as a constant M (Operation S11). The determination unit 23 sets the variable m to 1 (Operation S12). Then, the determination unit 23 acquires the number of virtual machines (N) included in the m-th combination, and sets the variable n to 1 (Operations S13 and S14). Thereafter, the determination unit 23 obtains a throughput of the n-th virtual machine in the m-th combination by using the throughput database 31 (Operation S15). Subsequently, the determination unit 23 determines whether or not the variable n is not less than the constant N (Operation S16). When the variable n is less than the constant N, the determination unit 23 increments the variable n by 1, and repeats the processing of Operations S15 and S16 (No in Operation S16, Operation S17).

On the other hand, when the variable n is not less than the constant N, it represents that the estimated throughput is obtained for all the virtual machines included in the m-th combination (Yes in Operation S16). Therefore, the determination unit 23 selects a virtual machine with a minimum throughput obtained for the m-th combination (Operation S18). Then, the determination unit 23 sets the throughput of the virtual machine selected in Operation S18 as the throughput obtained by the m-th combination (Operation S19). Thereafter, the determination unit 23 determines whether or not the variable m is not less than the constant M (Operation S20). When the variable m is less than the constant M, the determination unit 23 increments the variable m by 1, and repeats the processing of Operations S13 to S20 (No in Operation S20, Operation S21).

On the other hand, when the variable m is not less than the constant M, it represents that the estimated throughput is obtained for all the combinations requested (Yes in Operation S20). Therefore, the determination unit 23 extracts combinations to obtain the requested throughput or more (Operation S22). Then, the determination unit 23 specifies combinations with the smallest total number of CPU cores used among the extracted combinations (Operation S23). Thereafter, the determination unit 23 sets the combination with the maximum throughput among the specified combinations as the determined pattern (Operation S24).

As described above, in the design method according to the first embodiment, settable signature assignment patterns are calculated, including patterns other than those in the case of implementing one network function with one virtual machine. Moreover, a combination which satisfies the requested throughput and has the smallest number of resources to be used, among the combination patterns of the assignment patterns and the CPU core allocation conditions, is set as the pattern (determined pattern) for use in the setting processing. Therefore, compared with the case where a service chain is designed considering only a case of assigning one VNF to one virtual machine, the signatures may be arranged to enable efficient use of the virtual machines. Furthermore, as for the patterns with different resources such as CPU cores set for the individual virtual machines, a service chain is also designed after obtaining a throughput, so as to satisfy the throughput requested by the user and to minimize the amount of resources to be used. Thus, the first embodiment makes it easier to efficiently set the communication system.

<Modified Example>

As a modified example of the first embodiment, description is given of a case where the control apparatus 10 includes the measurement processor 28. The setting of a service chain is performed in the same manner as the first embodiment also when the control apparatus 10 includes the measurement processor 28.

The measurement processor 28 measures an amount of packets inputted per unit time and an amount of packets outputted per unit time for each of the virtual machines in the set service chain. Note that any known method is used to obtain the amount of packets inputted to the virtual machine per unit time and the amount of packets outputted from the virtual machine per unit time.

when the amount of packets inputted to the virtual machine per unit time exceeds the amount of packets outputted from the same virtual machine per unit time, the measurement processor 28 updates the throughput database 31 with information obtained in this event. For example, while packets are inputted at 2 Gbps to a certain virtual machine, the virtual machine has a throughput of 1.5 Gbps. In this case, a measured value of throughput is registered in the throughput database 31, as the maximum value of throughput obtained for the number of CPU cores allocated to the virtual machine.

Note that the measurement processor 28 performs the measurement processing for every virtual machine. Also, the number of signatures registered with each virtual machine is specified from the result of the processing by the signature registration unit 25. Note that the signature registration unit 25 may record the signature registration result in the storage unit 30.

On the other hand, when the amount of packets inputted to the virtual machine per unit time does not exceed the amount of packets outputted from the virtual machine per unit time, the obtained throughput is not a throughput limit value of the virtual machine. Therefore, when the amount of packets inputted to the virtual machine per unit time does not exceed the amount of packets outputted from the virtual machine per unit time, the measurement processor 28 does not register the measurement result in the throughput database 31.

When the throughput database 31 is updated with the actual communication result after the service chain is set as described above, the update processing improves the reliability of the information in the throughput database 31. Therefore, the accuracy of the throughput estimation using the throughput database 31 is also improved.

Second Embodiment

In a second embodiment, description is given of a processing example when signatures to be used in VNF provided in a service chain are added after the service chain is set.

FIG. 10 is a diagram illustrating an example of a case where signatures are added. In FIG. 10, service chains SC11 and SC12 are set. The service chain SC11 includes two virtual machines VM1 and VM2. One CPU core is allocated to the virtual machine VM1, and 5000 signatures for antivirus processing are registered therewith. One CPU core is allocated to the virtual machine VM2, and 3000 signatures for IPS processing are registered therewith.

Meanwhile, the service chain SC12 includes one virtual machine VM3. Four CPU cores are allocated to the virtual machine VM3, and 5000 signatures for antivirus processing and 3000 signatures for IPS processing are registered therewith.

After the service chains SC11 and SC12 are set, C signatures are added for use in the IPS processing and also D signatures are added for use in the antivirus processing. Then, a provider or an operator of applications for the IPS processing and the antivirus processing registers the added signatures with the control apparatus 10. In the example of FIG. 10, the processing of registering the added signatures is performed through a network. An example of processing performed for the case illustrated in FIG. 10 is described below with reference to flowcharts.

Figure 11A:
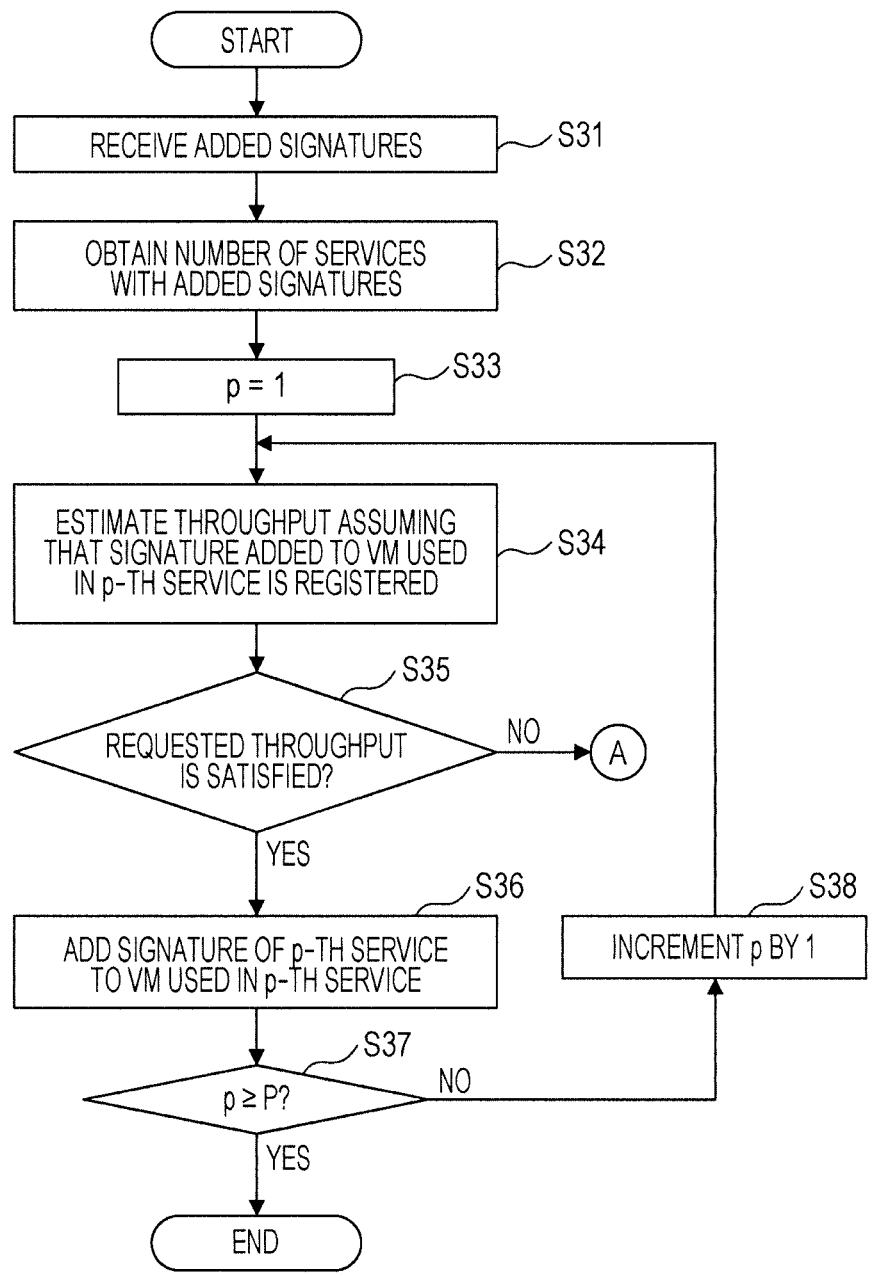
FIGS. 11A, B are flowcharts illustrating an example of a design method according to a second embodiment.
Figure 11B:
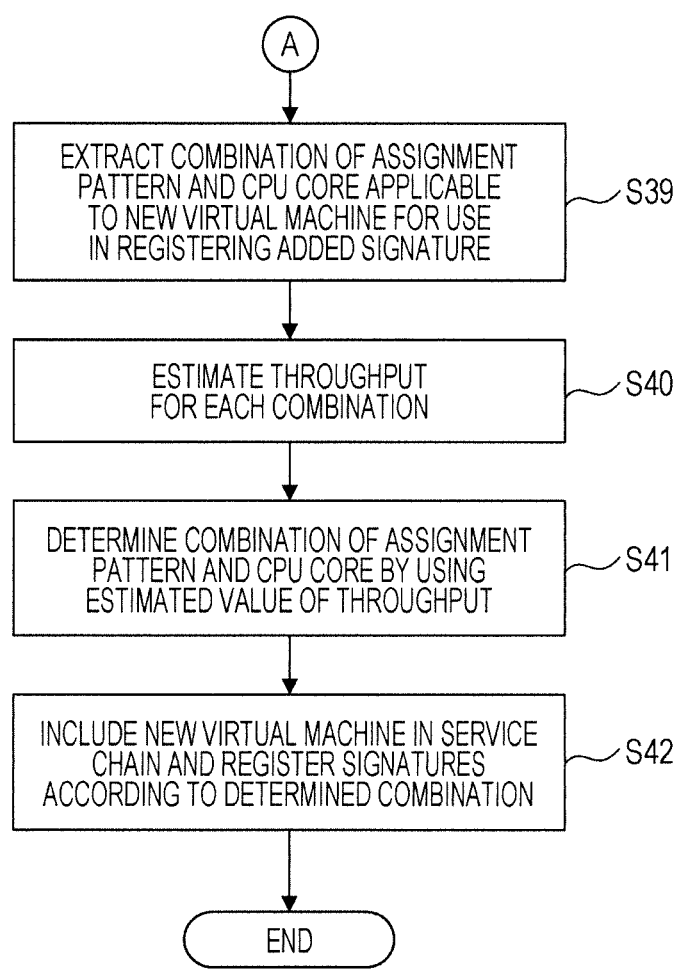

FIGS. 11A and 11B are flowcharts illustrating an example of a design method according to the second embodiment. Note that, in FIG. 11A, a variable p is used to count the number of services as the processing target.

The receiver 12 in the control apparatus 10 receives the added signatures (Operation S31). The reception processor 21 acquires information including the added signatures. Then, the reception processor 21 adds the added signatures to the application setting information 33. Furthermore, the reception processor 21 notifies the determination unit 23 of the addition of the signatures. In this event, the reception processor 21 also notifies the determination unit 23 of the kinds of applications to use the added signatures. In the example illustrated in FIG. 10, the reception processor 21 notifies the determination unit 23 of the addition of the signatures to the application for use in the antivirus processing and the application for use in the IPS processing.

The determination unit 23 obtains the total number P of services with signatures added thereto (Operation S32). In the example of FIG. 10, the total number P of services with signatures added thereto is 2. The determination unit 23 sets the variable p to 1 (Operation S33). Then, the determination unit 23 estimates a throughput to be obtained assuming that the added signatures are registered with the virtual machine used in the p-th service (Operation S34). In the processing of Operation S34, the determination unit 23 accordingly uses the throughput database 31. The determination unit 23 determines whether or not the throughput upon registration of the signatures added in connection with the p-th service satisfies the requested throughput (Operation S35). When the requested throughput is satisfied even after the registration of the added signatures, the determination unit 23 determines that the signatures added for the p-th service are added to the virtual machine used in the p-th service (Yes in Operation S35). In response to the determination made by the determination unit 23, the signature registration unit 25 registers the signatures added for the p-th service with the virtual machine used in the p-th service (Operation S36). The determination unit 23 compares the variable p with the constant P, and terminates the processing when the variable p is not less than the constant P (Yes in Operation S37). On the other hand, when the variable p is less than the constant P, the determination unit 23 increments the variable p by 1, and repeats the processing of Operations S34 to S37 (No in Operation S37, Operation S38).

In the service chain SC12, for example, the throughput estimated for the virtual machine VM3 exceeds the throughput requested in the service chain generation request even after C signatures added for the IPS processing are added to the virtual machine VM3. Then, the signature registration unit 25 adds the C signatures added for the IPS processing to the virtual machine VM3. Next, as for the case where D signatures added for the antivirus processing are further added to the virtual machine VM3, the determination unit 23 compares a throughput to be obtained with the throughput requested for the service chain. Here, a throughput estimated assuming that signatures are added to the virtual machine VM3 exceeds the throughput requested in the service chain generation request. Then, the signature registration unit 25 also adds the D signatures added for the antivirus processing to the virtual machine VM3.

Next, with reference to FIG. 11B, description is given of processing when it is determined in Operation S35 that the throughput obtained by the virtual machine does not satisfy the requested throughput upon registration of the added signatures (No in Operation S35). When the requested throughput is not satisfied upon registration of the added signatures, the determination unit 23 notifies the pattern calculator 22 of setting the added signatures in a new virtual machine. The pattern calculator 22 obtains combinations of applicable assignment patterns and CPU core allocations for the new virtual machine for use in registration of the added signatures (Operation S39). The determination unit 23 estimates a throughput to be obtained for each of the combinations obtained by the pattern calculator 22 (Operation S40). This throughput estimation processing is performed in the same manner as the first embodiment. The determination unit 23 determines a combination of the assignment pattern and the CPU core by using the estimated value of throughput (Operation S41). The determination processing in Operation S41 is the same as the processing described with reference to FIGS. 8 and 9. Thereafter, the device setting unit 26 and the path setting unit 27 include the new virtual machine in the service chain. Subsequently, the signature registration unit 25 registers the signatures according to the determined combination (Operation S42).

For example, in the service chain SC11 illustrated in FIG. 10, the requested throughput may not be obtained when the D signatures added for the antivirus processing are added to the virtual machine VM1. Then, the pattern calculator 22 calculates an assignment pattern of the added signatures for the case where one or more new virtual machines are added into the service chain. As a result, the determination unit 23 determines that two CPU cores are allocated to a virtual machine VM4 (not illustrated) and the C signatures added for the IPS processing and the D signatures added for the antivirus processing are registered with the virtual machine VM4. Then, the device setting unit 26 adds the virtual machine VM4 into the service chain SC11. The path calculator 24 recalculates the transfer path used in the service chain SC11, and the path setting unit 27 sets new path information. The signature registration unit 25 registers the added signatures with the newly started virtual machine VM4 along the pattern determined by the determination unit 23.

As described above, even when the signatures for use in the applications to implement services provided in the service chain are added during the operation of the service chain, the signatures are assigned to the virtual machines such that the resources are efficiently used. Therefore, according to the second embodiment, a communication system may be efficiently designed even when signatures are added during the operation of the service chain.

Third Embodiment

In a third embodiment, description is given of an example of the design processing described in the first and second embodiments, for a case where mathematical descriptions are used in the pattern calculator 22 and the determination unit 23 to easily calculate multiple combination patterns.

Figure 12:
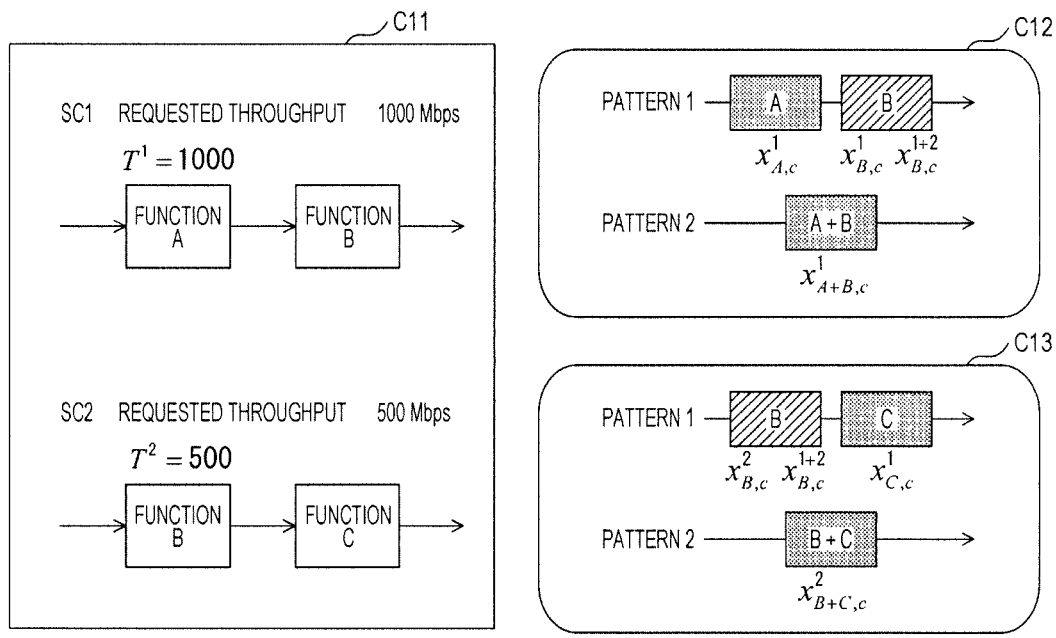
FIG. 12 is a diagram illustrating a variable setting example according to a third embodiment.

FIG. 12 is a diagram illustrating a variable setting example according to the third embodiment. Here, users 1 and 2 request the control apparatus 10 to generate different service chains. Hereinafter, as illustrated in a case C11, a service chain requested by the user 1 is described as SC1 and a service chain requested by the user 2 is described as SC2. In the service chain SC1, a throughput of 1000 Mbps is requested through VNF to provide a function A and then VNF to provide a function B. Here, the requested throughput is T and the number of a service chain is described as a superscript attached to T. Then, the requested throughput in the service chain SC1 is expressed as $T^1$=1000 Mbps. In the service chain SC2, a throughput of 500 Mbps is requested through VNF to provide the function B and then VNF to provide a function C.

Then, the requested throughput in the service chain SC2 is expressed as $T^2$=500 Mbps.

A case C12 represents an example of virtual machines included in the service chain SC1. When the functions A and B are provided by different virtual machines, signatures of the functions A and B are registered with the different virtual machines as illustrated in an assignment pattern 1 in the case C12. On the other hand, when the functions A and B are provided by the same virtual machine, the signatures of the functions A and B are registered with the same virtual machine as illustrated in an assignment pattern 2 in the case C12.

A case C13 represents an example of virtual machines included in the service chain SC2. When the functions B and C are provided by different virtual machines, signatures of the functions B and C are registered with the different virtual machines as illustrated in an assignment pattern 1 in the case C13. On the other hand, when the functions B and C are provided by the same virtual machine, the signatures of the functions B and C are registered with the same virtual machine as illustrated in an assignment pattern 2 in the case C13.

Note that, when both of the service chains SC1 and SC2 are generated by using the assignment pattern 1, the function B is provided by one virtual machine in both of the service chains. Moreover, in this case, the virtual machine that provides the function B does not provide any other functions than the function B. Therefore, when both of the service chains SC1 and SC2 are generated by using the assignment pattern 1, the virtual machine used to provide the function B may also be set as the same virtual machine in both of the service chains SC1 and SC2.

Next, description is given of setting of variables indicating whether to generate virtual machines. In the third embodiment, a variable x indicating whether to generate a virtual machine with the number c of CPU cores allocated thereto is set for each VNF to implement a certain function in each service chain. The case C12 represents an example of variables used in calculation in the service chain SC1. A superscript attached to x is the number described after SC in the reference symbol of the service chain using the variable, and is used to identify the service chain. As for a subscript attached to x, the kind of the function provided by the VNF is set before the comma and the number c of CPU cores is set after the comma. Note that the number c of CPU cores is a variable, and thus any of those within a range set under the conditions for the calculation may be used.

For example, $x^1_{A,c}$ is a variable describing whether to generate a virtual machine that operates as the function A and has c CPU cores set therein in the service chain SC1. A case where the number of CPU cores is 1 (c=1) is described as $x^1_{A,1}$, and a case where the number of CPU cores is 2 (c=2) is described as $x^1_{A,2}$. Here, the variable indicating whether to generate the virtual machine, such as $x^1_{A,c}$, takes a value of either 0 or 1. $x^1_{A,c}=1$ represents that the virtual machine specified by $x^1_{A,c}$ is generated. On the other hand, $x^1_{A,c}=0$ represents that the virtual machine specified by $x^1_{A,c}$ is not generated.

Likewise, $x^1_{B,c}$ is a variable describing whether to generate a virtual machine that operates as the function B and has c CPU cores set therein in the service chain SC1. $x^1_{A+B,c}$ is a variable describing whether to generate a virtual machine that provides the both functions A and B and has c CPU cores set therein in the service chain SC1.

The variables in the case C13 are also used to describe whether to generate a virtual machine. $x^2_{B,c}$ is a variable describing whether to generate a virtual machine that operates as the function B and has c CPU cores set therein in the service chain SC2. $x^2_{C,c}$ is a variable describing whether to generate a virtual machine that operates as the function C and has c CPU cores set therein in the service chain SC2. $x^2_{B+C,c}$ is a variable describing whether to generate a virtual machine that provides the both functions B and C and has c CPU cores set therein in the service chain SC2.

Next, description is given of variables used to describe a case where the same virtual machine may be used in more than one service chain. In the variables used to describe whether to generate a virtual machine included in more than one service chain, the superscript used to specify the service chain includes the numbers of all service chains that may include the virtual machine. In the cases C12 and C13, for example, $x^{1+2}_{B,c}$ is used as a variable indicating whether to share the virtual machine that provides the function B in the service chain. $x^{1+2}_{B,c}$ is a variable describing whether to generate a virtual machine that operates as the function B and has c CPU cores set therein in both of the service chains SC1 and SC2.

A case C21 in FIG. 13 represents a setting example of constraint conditions according to the third embodiment. The variable p indicates whether to use a specific assignment pattern in a certain service chain. A superscript attached to p is the number described after SC in the reference symbol of the service chain using the variable. A subscript attached to p is the kind of the assignment pattern used in the service chain. For example, $p^1_1$ defined in Equations (11) and (12) indicates whether to use the assignment pattern 1 in the service chain SC1. Meanwhile, $p^2_1$ defined in Equations (21) and (22) indicates whether to use the assignment pattern 2 in the service chain SC1. Likewise, $p^1_2$ is a variable indicating whether to use the assignment pattern 2 in the service chain SC1, and $p^2_2$ is a variable indicating whether to use the assignment pattern 2 in the service chain SC2.

In Equation (11), $p^1_1$ is defined as the same value as the total sum of possible values in all possible patterns of the number c of CPU cores for $x^1_{A,c}$. Here, in among the variable defined by $x^1_{A,c}$, the variable adopted in the determined pattern takes a value of 1, while the variable not adopted in the determined pattern takes a value of 0. When the assignment pattern 1 is used in the service chain SC1, the virtual machine that provides only the function A is generated by using any number of CPU cores, and thus $p^1_1$ is 1. Likewise, in Equation (12), $p^1_1$ is defined to be equal to the sum of possibilities that the virtual machine that provides only the function B is generated in any configurations. More specifically, $p^1_1$ is set to the sum of the cases where the virtual machine that provides the function B is generated for the service chain SC1 and where the virtual machine that provides the function B is generated for both of the service chains SC1 and SC2. In Equation (13), $p^1_2$ is defined to be equal to the sum of possibilities that the virtual machine that provides both of the functions A and B is generated in any configurations.

Here, when the assignment pattern 1 is adopted in the service chain SC1, the assignment pattern 2 is not adopted in the service chain SC1. In other words, when $p^1_1$ is 1, $p^1_2$ is not 1. This condition is described in Equation (14). Therefore, Equation (14) describes that any of the assignment patterns is selected in the service chain SC1.

Equations (15) to (17) define conditions for the throughput obtained in the service chain SC1. F(S) is a throughput obtained by a virtual machine with S signatures registered therewith. A value before the comma in a subscript attached to S indicates the kind of the function provided by each signature, and a value after the comma indicates the number of CPU cores allocated to a virtual machine that processes the signature. For example, $F(S_{A,c})$ is a throughput obtained by a virtual machine with c CPU cores when S signatures of the application used to provide the function A are registered with the virtual machine. In Equation (15), the throughput is set to be not more than the product of $F(S_{A,c})$ and $x^1_{A,c}$. Here, among the variables expressed as $x^1_{A,c}$, those other than variables indicating settings adopted for the design of the service chain SC1 are 0. Therefore, the value in Equation (15) is a throughput obtained by the virtual machine that provides the function A when the assignment pattern 1 is adopted in the service chain SC1. Accordingly, Equation (15) describes a condition that, when the assignment pattern 1 is adopted in the service chain SC1, the throughput from the virtual machine that provides the function A is not less than the throughput ($T^1$) requested for the service chain SC1. Likewise, Equation (16) describes a condition that, when the assignment pattern 1 is adopted in the service chain SC1, the throughput from the virtual machine that provides the function B is not less than the throughput ($T^1$) requested for the service chain SC1. Equation (17) describes a condition that, when the assignment pattern 2 is adopted in the service chain SC1, the throughput from the virtual machine that provides the functions A and B is not less than the throughput ($T^1$) requested for the service chain SC1.

Equations (21) to (27) define the same conditions as those of Equations (11) to (17) for the service chain SC2. For example, Equation (21) defines that the possibility ($p^2_1$) that the assignment pattern 1 is used in the service chain SC2 is equal to the possibility that the virtual machine that provides only the function B is generated in any configuration. Equation (22) defines that the possibility ($p^2_1$) that the assignment pattern 1 is used in the service chain SC2 is equal to the possibility that the virtual machine that provides only the function C is generated in any configuration. Equation (23) defines that the possibility ($p^2_2$) that the assignment pattern 2 is used in the service chain SC2 is equal to the possibility that the virtual machine that provides both of the functions B and C is generated in any configuration. Equation (24) describes that any one of the assignment patterns 1 and 2 is applied in the service chain SC2.

Equation (25) describes a condition that, when the assignment pattern 1 is adopted in the service chain SC2, the throughput from the virtual machine that provides the function B is not less than the throughput ($T^2$) requested for the service chain SC2. Equation (26) describes a condition that, when the assignment pattern 1 is adopted in the service chain SC2, the throughput from the virtual machine that provides the function C is not less than the throughput ($T^2$) requested for the service chain SC2. Equation (27) describes a condition that, when the assignment pattern 2 is adopted in the service chain SC2, the throughput from the virtual machine that provides the functions B and C is not less than the throughput ($T^2$) requested for the service chain SC2.

Equation (31) is used to determine whether or not the function B may be provided in both of the service chains SC1 and SC2. The virtual machine that provides the function B in both of the service chains SC1 and SC2 may simultaneously perform packet processing in both of the service chains SC1 and SC2. Therefore, the virtual machine shared by the both service chains SC1 and SC2 is requested to have a throughput larger than the sum of throughputs requested for the both service chains SC1 and SC2. This condition is described in Equation (31). More specifically, Equation (31) describes the condition that the throughput of the virtual machine that provides the function B in both of the service chains SC1 and SC2 is not less than the sum of the throughputs requested for the both service chains SC1 and SC2.

Figure 14:
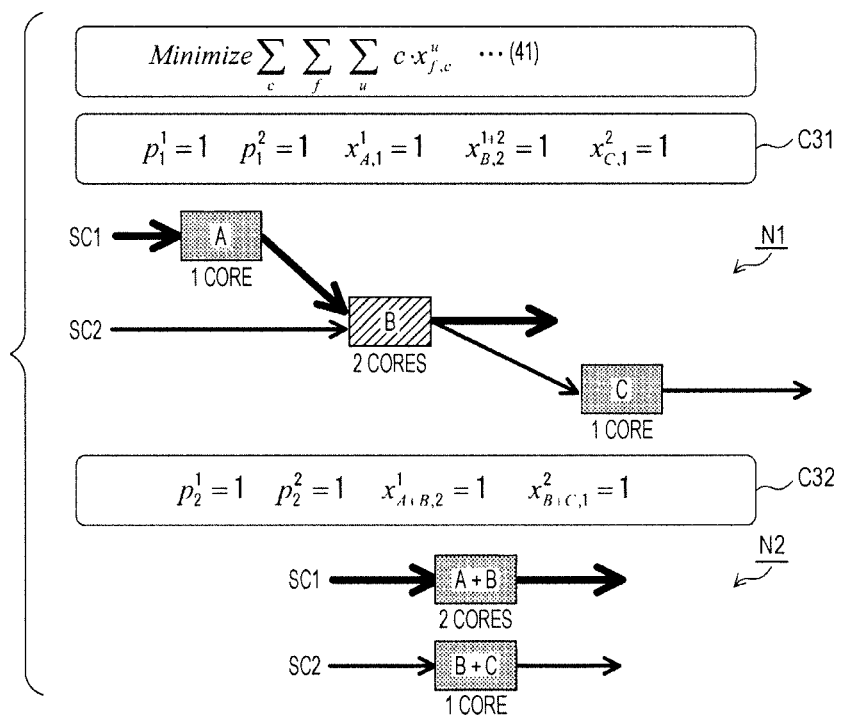
FIG. 14 is a diagram illustrating an example of design result.

FIG. 14 illustrates an objective function calculated under the constraint conditions described in FIG. 13, and also illustrates an example of a design result obtained from the calculation result of the objective function. The determination unit 23 calculates the objective function expressed by Equation (41) under the constraint conditions described in FIG. 13. The objective function describes the objective of minimizing the number of CPU cores allocated to the virtual machine used for processing of the respective functions across all the service chains to be designed. In Equation (41), $x^u_{f,c}$ indicates whether or not there is a possibility of generating a virtual machine that implements a function f by using c CPU cores. Therefore, calculating the sum of the products of the numbers of CPU cores and $x^u_{f,c}$ for all the values of c results in the number of CPU cores used in the virtual machine that implements the function f in the u-th service chain. Furthermore, calculating the sum of all the functions for all the service chains results in the total number of CPU cores used in the entire service chain to be concurrently designed, as a target to be minimized.

Here, among the values added up in the objective function, a value including a possibility of generating a virtual machine included in more than one communication path, such as $x^{1+2}_{B,c}$, corresponds to a pattern in which one virtual machine is shared by more than one communication path. On the other hand, a value not including the possibility of generating the virtual machine included in more than one communication path corresponds to a pattern in which one virtual machine is not shared by more than one communication path. By processing the objective function, the determination unit 23 determines a pattern for use in designing a path, among all patterns including a pattern group in which one virtual machine is shared by more than one communication path and a pattern group in which one virtual machine is not shared by more than one communication path. Note that, by also calculating the sum of the allocation statuses of the number of CPU cores for $x^u_{f,c}$, the determination unit 23 also determines combination patterns with different CPU core allocation statuses for each pattern.

It is assumed that a solution denoted by a case C31 is obtained as a result of analysis of the objective function by the determination unit 23 using the constraint conditions and the like. Since $p^1_1=1$ in the solution of the case C31, the virtual machine that provides the function A and the virtual machine that provides the function B are separately generated along the assignment pattern 1 in the service chain SC1. Likewise, since $p^2_1=1$, the virtual machine that provides the function B and the virtual machine that provides the function C are also separately generated along the assignment pattern 1 in the service chain SC2. With $x^1_{A,1}=1$, one CPU core is allocated to the virtual machine that provides the function A in the service chain SC1. With $x^{1+2}_{B,2}=1$, two CPU cores are allocated to the virtual machine that provides the function B, and the virtual machine that provides the function B is used in both of the service chains SC1 and SC2. With $x^2_{C,1}=1$, one CPU core is allocated to the virtual machine that provides the function C in the service chain SC2.

A method for performing the start-up of the virtual machines, setting of a path, setting of signatures in the virtual machines, and the like by using the information thus obtained is the same as that in the first embodiment. With the information indicated by the case C31, service chains SC1 and SC2 are generated as illustrated in a network N1. The service chain SC1 is indicated by a thick arrow, while the service chain SC2 is indicated by a thin arrow. Note that, in the network N1, the number of CPU cores allocated to a virtual machine that provides each function is described below the square representing the virtual machine.

Next, description is given of an example of a solution obtained when there is no virtual machine shared by service chains, and of a network design example. It is assumed that a solution denoted by a case C32 is obtained as a result of analysis of the objective function by the determination unit 23 using the constraint conditions and the like. Since $p^1_2=1$ in the solution of the case C32, the virtual machine that provides both of the functions A and B is generated along the assignment pattern 2 in the service chain SC1. Likewise, since $p^2_2=1$ is obtained, the virtual machine that provides both of the functions B and C is also generated along the assignment pattern 2 in the service chain SC2. With $x^1_{A+B,2}=1$, two CPU cores are allocated to the virtual machine that provides the functions A and B in the service chain SC1. With $x^2_{B+C,1}=1$, one CPU core is allocated to the virtual machine that provides the functions B and C in the service chain SC2.

With the information indicated by the case C32, service chains SC1 and SC2 are generated as illustrated in a network N2. The service chain SC1 is indicated by a thick arrow, while the service chain SC2 is indicated by a thin arrow. In the network N2, again, the number of CPU cores allocated to a virtual machine that provides each function is described below the square representing the virtual machine.

Note that the above description is an example, and the number of service chains to be concurrently designed and the number of VNF included in each of the service chains may be arbitrarily changed according to implementation.

As described above, the use of pattern for use in setting each service chain in the calculation processing using the objective function makes it possible to easily specify the patterns for use in setting compared with the first embodiment. For example, in the case of the first embodiment, designs of the respective service chains are individually determined as described with reference to FIGS. 7 and 8. Therefore, it is not determined whether or not the number of CPU cores used in the entire system may be reduced by sharing the virtual machine in more than one service chain. On the other hand, in the third embodiment, a design with a small number of CPU cores used is obtained, including when the virtual machine is shared by multiple service chains that are concurrently designed. Therefore, in the third embodiment, the system may be designed more efficiently than the first embodiment.

Fourth Embodiment

In a fourth embodiment, description is given of an example where a communication path is designed by using physical appliances with signatures registered therewith. In the following description, the "physical appliances" are dedicated devices for security processing. Note that the physical appliances may be implemented by physical servers or the like.

In the fourth embodiment, a control apparatus 10 also receives a request to set a communication path from a user or an operator. A reception processor 21 receives the request to set a communication path through a receiver 12, and then stores information requested in the setting request as setting request information 35 in the storage unit 30. A pattern calculator 22 performs the same processing as that in the first embodiment to acquire the number of signatures used to implement security functions in the communication path, from application setting information 33, and to obtain signature assignment patterns.

Figure 15:
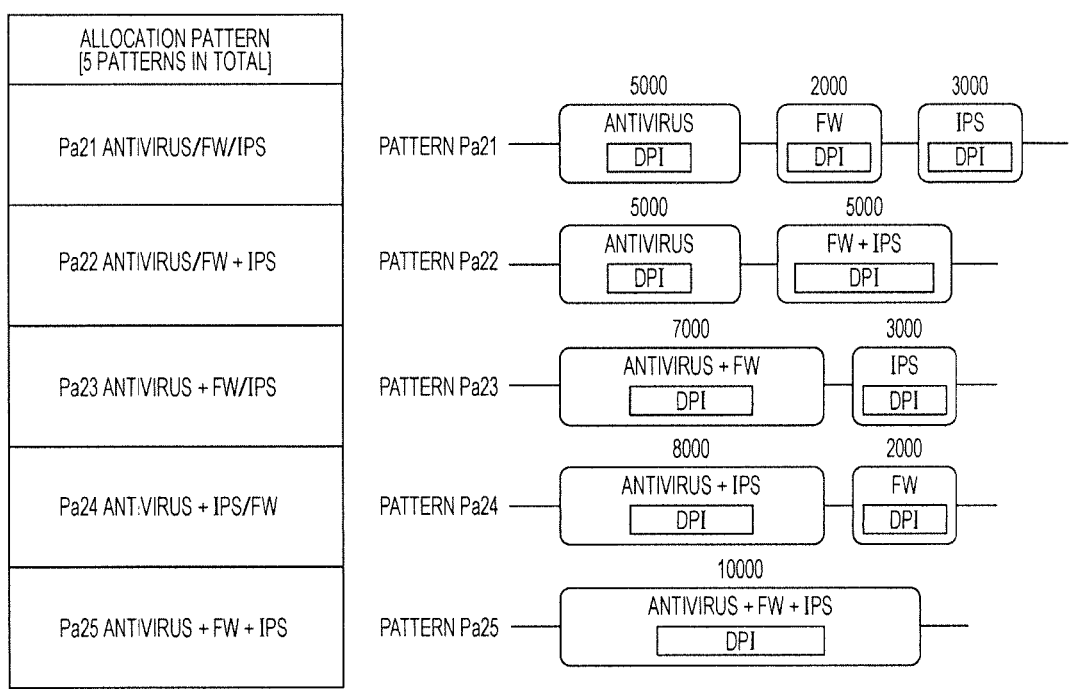
FIG. 15 is a diagram illustrating an example of assignment patterns according to a fourth embodiment.

FIG. 15 is a diagram illustrating an example of assignment patterns according to the fourth embodiment. FIG. 15 illustrates an example of assignment patterns obtained when it is specified that three security functions, an antivirus, a firewall (FW), and an IPS, are included in a communication path, and that the antivirus is applied first in the communication path. In the example of FIG. 15, the antivirus uses 5000 signatures, the firewall uses 2000 signatures, and the IPS uses 3000 signatures.

In an assignment pattern Pa21, the signatures of the antivirus, the firewall, and the IPS are implemented by different physical appliances. Therefore, the communication path includes three physical appliances. The signatures of the security function to be processed by each physical appliance are assigned as the target to be registered to the physical appliance.

In an application pattern Pa22, the antivirus is implemented by one physical appliance, and the firewall and the IPS are implemented by another physical appliance. Therefore, 5000 signatures are registered with the physical appliance that performs the antivirus processing. Meanwhile, since the signatures of the firewall and the IPS are also registered with the physical appliance that operates as the firewall and the IPS, 5000 signatures are assigned thereto as the target to be registered.

In an application pattern Pa23, the antivirus and the firewall are implemented by one physical appliance, and the IPS is implemented by another physical appliance. Therefore, since the signatures of both of the antivirus and the firewall are registered with the physical appliance that performs the processing of the antivirus and the firewall, 7000 signatures are assigned thereto. Meanwhile, 3000 signatures are assigned as the target to be registered to the physical appliance that operates as the IPS.

In an application pattern Pa24, the antivirus and the IPS are implemented by one physical appliance, and the firewall is implemented by another physical appliance. Therefore, since the signatures of both of the antivirus and the IPS are registered with the physical appliance that performs the processing of the antivirus and the IPS, 8000 signatures are assigned thereto. Meanwhile, 2000 signatures are assigned as the target to be registered to the physical appliance that operates as the firewall.

In an assignment pattern Pa25, the signatures of the antivirus, the firewall, and the IPS are implemented by one physical appliance. Therefore, the communication path includes one physical appliance. 10000 signatures associated with the antivirus, the firewall, and the IPS are assigned as the target to be registered to the physical appliance.

Note that when the communication path with the security functions is designed by assigning signatures to physical appliances, the number of CPU cores in each of the physical appliances does not fluctuate. Thus, the pattern calculator 22 does not calculate combinations corresponding to the number of CPU cores. Once the assignment patterns are calculated by the pattern calculator 22, the determination unit 23 obtains an estimated throughput for each assignment pattern by using the throughput database 31. In the fourth embodiment, the throughput database 31 records a relationship between the number of signatures registered and the throughput for each of physical appliances used to generate a communication path.

Figure 16:
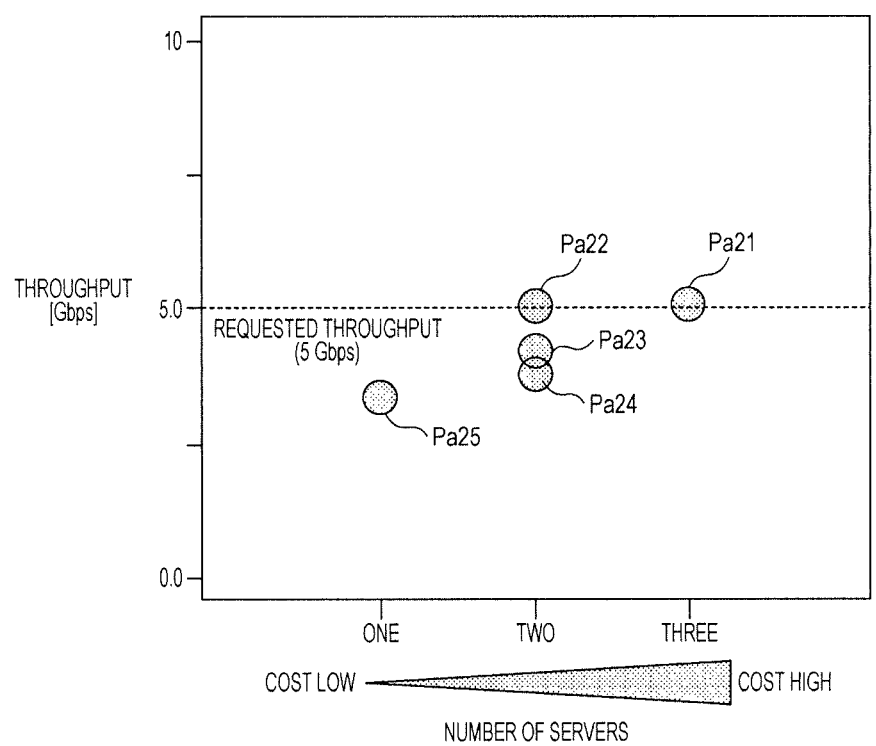
FIG. 16 is a diagram illustrating a calculation example of a throughput obtained in each assignment pattern.

FIG. 16 illustrates a calculation example of a throughput obtained in each assignment pattern. The assignment pattern Pa21 uses three physical appliances and has an estimated throughput of 5 Gbps. The assignment pattern Pa25 uses a physical appliances and has an estimated throughput of about 3 Gbps.

In the assignment patterns Pa22 to Pa24, each using two physical appliances, the throughput varies with the degree of distribution of the signatures. The throughput in each assignment pattern is estimated to have the same value as that of the throughput obtained by the physical appliance with the maximum number of signatures registered. Moreover, as described with reference to FIG. 6 and the like, the larger the number of signatures to be processed in the physical appliance, the smaller the estimated value of throughput. Therefore, among the assignment patterns Pa22 to Pa24, the throughput obtained is highest in the assignment pattern Pa22 and is gradually decreased in Pa23 and Pa24 in this order.

Here, the throughput requested for the communication path is 5 Gbps. Then, the determination unit 23 determines that the assignment patterns Pa21 and Pa22 both satisfy the requested throughput, based on the result illustrated in FIG. 16. The determination unit 23 determines that the assignment pattern with a smaller number of physical appliances used, between the assignment patterns that satisfy the requested throughput, is used for designing the communication path. In the example of FIG. 16, while three physical appliances are used in the assignment pattern Pa21, two physical appliances are used in the assignment pattern Pa22. Therefore, the determination unit 23 determines to use the assignment pattern Pa22.

The determination unit 23 notifies the path calculator 24 and the signature registration unit 25 of the assignment pattern to be used for setting the communication path. The path calculator 24 calculates a path for generating the communication path, and requests the path setting unit 27 to set a path. Meanwhile, the signature registration unit 25 performs processing for registering signatures with each of the physical appliances used for generating the path, the signatures being used by the physical appliance. The processing performed by the path calculator 24, the signature registration unit 25, and the path setting unit 27 is the same as that in the first embodiment except that the signatures are registered with the physical appliances.

Figure 17:
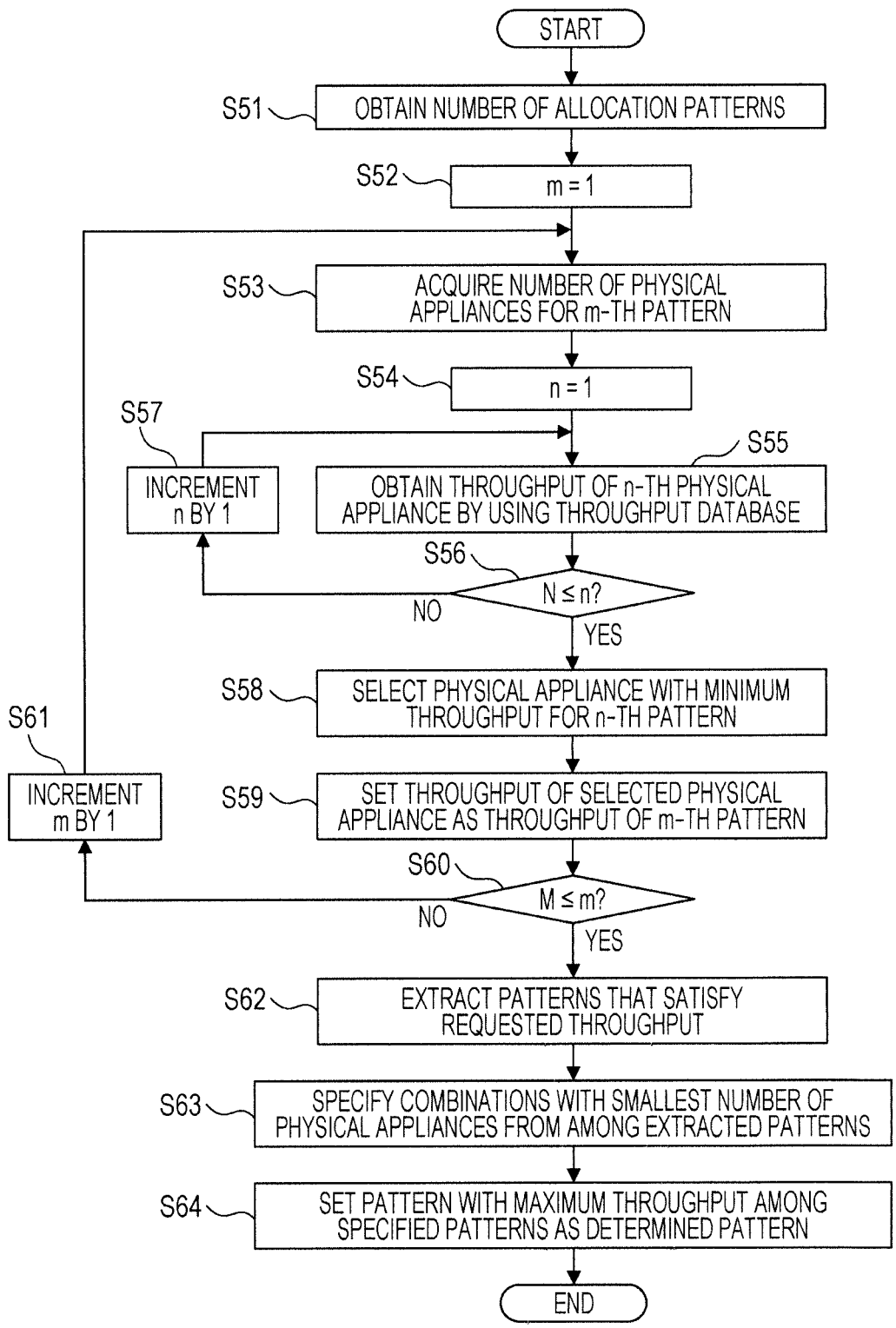
FIG. 17 is a flowchart illustrating an example of a design method according to the fourth embodiment.

FIG. 17 is a flowchart illustrating an example of a design method according to the fourth embodiment. FIG. 17 illustrates an example of the processing by the determination unit 23 in the fourth embodiment. In FIG. 17, variables m and n are used. The variable m is used to count the number of assignment patterns to be processed, while the variable n is used to count the number of physical appliances to be subjected to throughput estimation processing.

The determination unit 23 obtains the number of assignment patterns calculated by the pattern calculator 22 as a constant M (Operation S51). The determination unit 23 sets the variable m to 1 (Operation S52). Then, the determination unit 23 acquires the number of physical appliances (N) included in the m-th assignment pattern, and sets the variable n to 1 (Operations S53 and S54). Thereafter, the determination unit 23 obtains a throughput of the n-th physical appliance in the m-th assignment pattern by using the throughput database 31 (Operation S55). Subsequently, the determination unit 23 determines whether or not the variable n is not less than a constant N (Operation S56). When the variable n is less than the constant N, the determination unit 23 increments the variable n by 1, and repeats the processing of Operations S55 and S56 (No in Operation S56, Operation S57).

On the other hand, when the variable n is not less than the constant N, the estimated throughput is obtained for all the physical appliances included in the m-th assignment pattern (Yes in Operation S56). Therefore, the determination unit 23 selects a physical appliance with a minimum throughput obtained for the m-th assignment pattern (Operation S58). Then, the determination unit 23 sets the throughput of the physical appliance selected in Operation S58 as the throughput obtained by the m-th assignment pattern (Operation S59). Thereafter, the determination unit 23 determines whether or not the variable m is not less than the constant M (Operation S60). When the variable m is less than the constant M, the determination unit 23 increments the variable m by 1, and repeats the processing of Operations S53 to S60 (No in Operation S60, Operation S61).

On the other hand, when the variable m is not less than the constant M, the estimated throughput is obtained for all the assignment patterns requested (Yes in Operation S60). Therefore, the determination unit 23 extracts assignment patterns to obtain the requested throughput or more (Operation S62). Then, the determination unit 23 specifies combinations with the smallest number of physical appliances used among the extracted combinations (Operation S63). Thereafter, the determination unit 23 sets the assignment pattern with the maximum throughput among the specified combinations as the determined pattern (Operation S64).

According to the fourth embodiment, even when the communication path is designed by assigning signatures to physical appliances, a communication path that minimizes the number of the physical appliances may be set, including the case where the signatures of multiple applications are assigned to one physical appliance. Therefore, the communication system may be efficiently designed.

Others

Note that the embodiments are not limited to those described above, but various modifications may be made thereto. Some modification examples are described below.

For example, the second and fourth embodiments may be implemented in combination. For example, when a new processing condition is acquired after the setting of the communication path by using the physical appliances, the control apparatus 10 may perform the same processing as that in the second embodiment to set the new processing condition.

The mathematical notations used to describe the constraint conditions and the possibilities of generating the virtual machines in the third embodiment are an example, and may be changed according to the implementation.

The third and fourth embodiments may be implemented in combination. For example, multiple communication paths may be concurrently set, as described in the third embodiment, for the setting of the communication path by using the physical appliances.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A control apparatus comprising:
   a memory; and
   a processor coupled to the memory and the processor configured to:
   receive a request to generate a communication path through communication devices;
   calculate candidate assignment patterns to indicate a number of assigned communication devices among the communication devices, in each communication device a plurality of corresponding processing conditions to be set to be used in a process to be performed by each communication device;
   determine an assignment pattern from among the candidate assignment patterns to set the plurality of processing conditions to assigned communication devices of the determined assignment pattern, based on estimation information which indicate an association of a number of processing conditions settable to a communication device with an estimated value of a throughput of the communication device which is inversely proportional to a set number of processing conditions to use in a process to be performed by the communication device; and
   transmit a control packet to request each of the communication devices in the determined assignment pattern to set the corresponding processing condition.

2. The control apparatus according to claim 1, wherein to determine the assignment pattern, the processor is configured to
   calculate a first candidate assignment pattern in which a first processing condition of the plurality of processing conditions for use in first processing and a second processing condition of the plurality of processing conditions for use in second processing are both assigned to one communication device of the communication devices, calculate a second candidate assignment pattern in which each of the first processing condition and the second processing condition is assigned to a different communication device of the communication devices, and put priority on the first candidate assignment pattern over the second candidate assignment pattern when the first candidate assignment pattern and the second candidate assignment pattern both satisfy a condition that the throughput calculated using the estimation information is not less than a throughput requested for the communication path.

3. The control apparatus according to claim 1, wherein, when the communication devices on the communication path are virtual machines, to determine the assignment pattern, the processor is configured to calculate throughputs using the estimation information in combinations each including a candidate assignment pattern in which the plurality of processing conditions are assigned to the virtual machines that operate as respective communication devices, and a set number of CPU cores to be allocated to each of the virtual machines that operate as the respective communication devices, select candidate assignment patterns each satisfying a condition that a throughput is not less than a throughput requested for the communication path, and determine an assignment pattern that uses a smallest number of CPU cores among the selected candidate patterns.

4. The control apparatus according to claim 1, wherein, when a new processing condition for use in processing to be performed by the assigned communication devices on the communication path is received after the communication path is generated according to the determined assignment pattern, the processor is configured to specify a target communication device assigned with processing to which the new processing condition is applicable, estimate a value of the throughput of the target communication device to be obtained assuming that the new processing condition is registered with the target communication device, based on the estimation information, and determine that the new processing condition is registered with the target communication device, when the estimated value of the throughput is not less than a requested value of the throughput for the communication path.

5. The control apparatus according to claim 4, wherein, when the estimated value of the throughput is less than the requested value of the throughput for the communication path, the processor is configured to determine to add one or more new communication devices to the communication path, calculate candidate assignment patterns in each of which the new processing condition is assigned to the one or more new communication devices, and select a candidate assignment pattern to be used for registering the new processing condition from among the calculated candidate assignment patterns, based on the estimation information.

6. The control apparatus according to claim 1, wherein the processor is configured to receive a request to generate a first communication path and a request to generate a second communication path, specify common processing to be performed in both of the first communication path and the second communication path, calculate a first candidate assignment pattern group including a first candidate assignment pattern in which a processing condition for use in the common processing is assigned to a communication device arranged on both of the first communication path and the second communication path, calculate a second candidate assignment pattern group including a second candidate assignment pattern in which the processing condition for use in the common processing is assigned to a first communication device arranged on the first communication path and the processing condition for use in the common processing is assigned to a second communication device arranged on the second communication path, and determine an assignment pattern, based on the estimation information, among the first candidate assignment pattern group and the second candidate assignment pattern group.

7. The control apparatus according to claim 1, wherein the throughput of the communication device is further proportional to a number of CPU cores included in the communication device.

8. A processing method by a control apparatus to control communication devices, the processing method comprising:

receiving a request to generate a communication path through communication devices;

calculate candidate assignment patterns to indicate a number of assigned communication devices among the communication devices, in each communication device a plurality of corresponding processing conditions to be set to be used in a process to be performed by each communication device;

determine an assignment pattern from among the candidate assignment patterns to set the plurality of processing conditions to assigned communication devices of the determined assignment pattern, based on estimation information which indicate an association of a number of processing conditions settable to a communication device with an estimated value of a throughput of the communication device which is inversely proportional to a set number of processing conditions to use in a process to be performed by the communication device; and transmitting a control packet to request each of the communication devices in the determined assignment pattern to set the corresponding processing condition.

9. The processing method according to claim 8, wherein to determine the assignment pattern, the processor is configured to, calculate a first candidate assignment pattern in which a first processing condition of the plurality of processing conditions for use in first processing and a second processing condition of the plurality of processing conditions for use in second processing are both assigned to one communication device of the communication devices, calculate a second candidate assignment pattern in which each of the first processing condition and the second processing condition is assigned to a different communication device of the communication devices, and put priority on the first candidate assignment pattern over the second candidate assignment pattern when the first candidate assignment pattern and the second candidate assignment pattern both satisfy a condition that the throughput calculated using the estimation information is not less than a throughput requested for the communication path.

10. The processing method according to claim 8, wherein, when the communication devices on the communication path are virtual machines, to determine the assignment pattern, the processor is configured to, calculate throughputs using the estimation information in combinations each including a candidate assignment pattern in which the plurality of processing conditions are assigned to the virtual machines that operate as respective communication devices, and a set number of CPU cores to be allocated to each of the virtual machines that operate as the respective communication devices, select candidate assignment patterns each satisfying a condition that a throughput is not less than a throughput requested for the communication path, and determine an assignment pattern that uses a smallest number of CPU cores among the selected candidate patterns.

11. The processing method according to claim 8, wherein, when a new processing condition for use in processing to be performed by the communication devices on the communication path is received after the communication path is generated according to the determined assignment pattern, the processor is configured to specify a target communication device assigned with processing to which the new processing condition is applicable, estimate a value of the throughput of the target communication device to be obtained assuming that the new processing condition is registered with the target communication device, based on the estimation information, and determine that the new processing condition is registered with the target communication device, when the estimated value of the throughput is not less than a requested value of the throughput for the communication path.

12. The processing method according to claim 11, wherein, when the estimated value of the throughput is less than the requested value of the throughput for the communication path, the processor is configured to determine to add one or more new communication devices to the communication path, calculate candidate assignment patterns in each of which the new processing condition is assigned to the one or more new communication devices, and select a candidate assignment pattern to be used for registering the new processing condition from among the calculated candidate assignment patterns, based on the estimation information.

13. The processing method according to claim 8, wherein the processor is configured to receive a request to generate a first communication path and a request to generate a second communication path, specify common processing to be performed in both of the first communication path and the second communication path, calculate a first candidate assignment pattern group including a first candidate assignment pattern in which a processing condition for use in the common processing is assigned to a communication device arranged on both of the first communication path and the second communication path, calculate a second candidate assignment pattern group including a second candidate assignment pattern in which the processing condition for use in the common processing is assigned to a first communication device arranged on the first communication path and the processing condition for use in the common processing is assigned to a second communication device arranged on the second communication path, and determine an assignment pattern, based on the estimation information, among the first candidate assignment pattern group and the second candidate assignment pattern group.

14. The processing method according to claim 8, wherein the throughput of the communication device is further proportional to a number of CPU cores included in the communication device.

* * * * *